United States Patent
Sanders et al.

(10) Patent No.: US 11,115,899 B1
(45) Date of Patent: Sep. 7, 2021

(54) EXTENDED STAR LUMINAIRE NETWORK FORMED USING HEARTBEAT MESSAGES

(71) Applicant: ABL IP HOLDING LLC, Conyers, GA (US)

(72) Inventors: Alan David Sanders, Atlanta, GA (US); Richard L. Westrick, Jr., Social Circle, GA (US); Samar Shaker Soliman, Marietta, GA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 16/811,072

(22) Filed: Mar. 6, 2020

(51) Int. Cl.
| | |
|---|---|
| *H04W 40/24* | (2009.01) |
| *H04W 60/04* | (2009.01) |
| *H04W 40/22* | (2009.01) |
| *H05B 47/19* | (2020.01) |
| *H04W 88/04* | (2009.01) |
| *H04W 84/18* | (2009.01) |
| *H04W 88/16* | (2009.01) |

(52) U.S. Cl.
CPC ......... *H04W 40/248* (2013.01); *H04W 40/22* (2013.01); *H04W 60/04* (2013.01); *H05B 47/19* (2020.01); *H04W 84/18* (2013.01); *H04W 88/04* (2013.01); *H04W 88/16* (2013.01)

(58) Field of Classification Search
CPC ... H04W 40/248; H04W 40/22; H04W 60/04; H04W 88/04; H04W 84/18; H04W 88/16; H05B 47/19; H04B 7/00
See application file for complete search history.

(56) References Cited

U.S. PATENT DOCUMENTS

| | | | |
|---|---|---|---|
| 5,343,466 A | 8/1994 | Kawamura | |
| 5,974,236 A * | 10/1999 | Sherman | H04W 40/125 |
| | | | 709/221 |
| 9,531,632 B2 | 12/2016 | Hellhake et al. | |
| 9,820,361 B1 | 11/2017 | Turvy, Jr. et al. | |
| 9,883,570 B1 | 1/2018 | Turvy, Jr. et al. | |
| 2002/0042274 A1 | 4/2002 | Ades | |
| 2003/0109270 A1 | 6/2003 | Shorty | |
| 2004/0218548 A1 | 11/2004 | Kennedy et al. | |
| 2012/0076007 A1 | 3/2012 | Nelson | |

(Continued)

OTHER PUBLICATIONS

Centenaro, Marco, et al. "Long-range communications in unlicensed bands: The rising stars in the IoT and smart city scenarios." IEEE Wireless Communications 23.5 (2016): 60-67. (Year: 2016).*

(Continued)

*Primary Examiner* — Sharad Rampuria
(74) *Attorney, Agent, or Firm* — RatnerPrestia

(57) ABSTRACT

An example method for a radio frequency (RF) communication system, such as a lighting system, includes receiving, at a non-connected RF node via an extended star wireless network, a gateway heartbeat message that a gateway RF node transmits. The method further includes, in response to receiving the gateway heartbeat message from the gateway RF node, transmitting, via the extended star wireless network, a non-connected registration message to the gateway RF node. The method additionally includes in response to receiving a gateway acknowledgement message from the gateway RF node, configuring the non-connected RF node to act as a respective connected RF node.

18 Claims, 14 Drawing Sheets

(56) References Cited

U.S. PATENT DOCUMENTS

2014/0040483 A1  2/2014 Van Dussen et al.
2018/0026839 A1  1/2018 Hollinger et al.

OTHER PUBLICATIONS

Qayyum et al., "Multipoint Relaying for Flooding Broadcast Messages in Mobile Wireless Networks", 35th Annual Hawaii International Conference on System Sciences (HICSS 2002), Jan. 2002, Maui, Hawaii, United States, pp. 3866-3875.
Non Final Office Action for U.S. Appl. No. 16/662,691, dated Mar. 8, 2021, 11 pages.
Notice of Allowance for U.S. Appl. No. 16/662,691, dated Mar. 29, 2021, 5 pages.
Non Final Office Action for U.S. Appl. No. 16/825,264, dated Jul. 23, 2021, 34 pages.

* cited by examiner

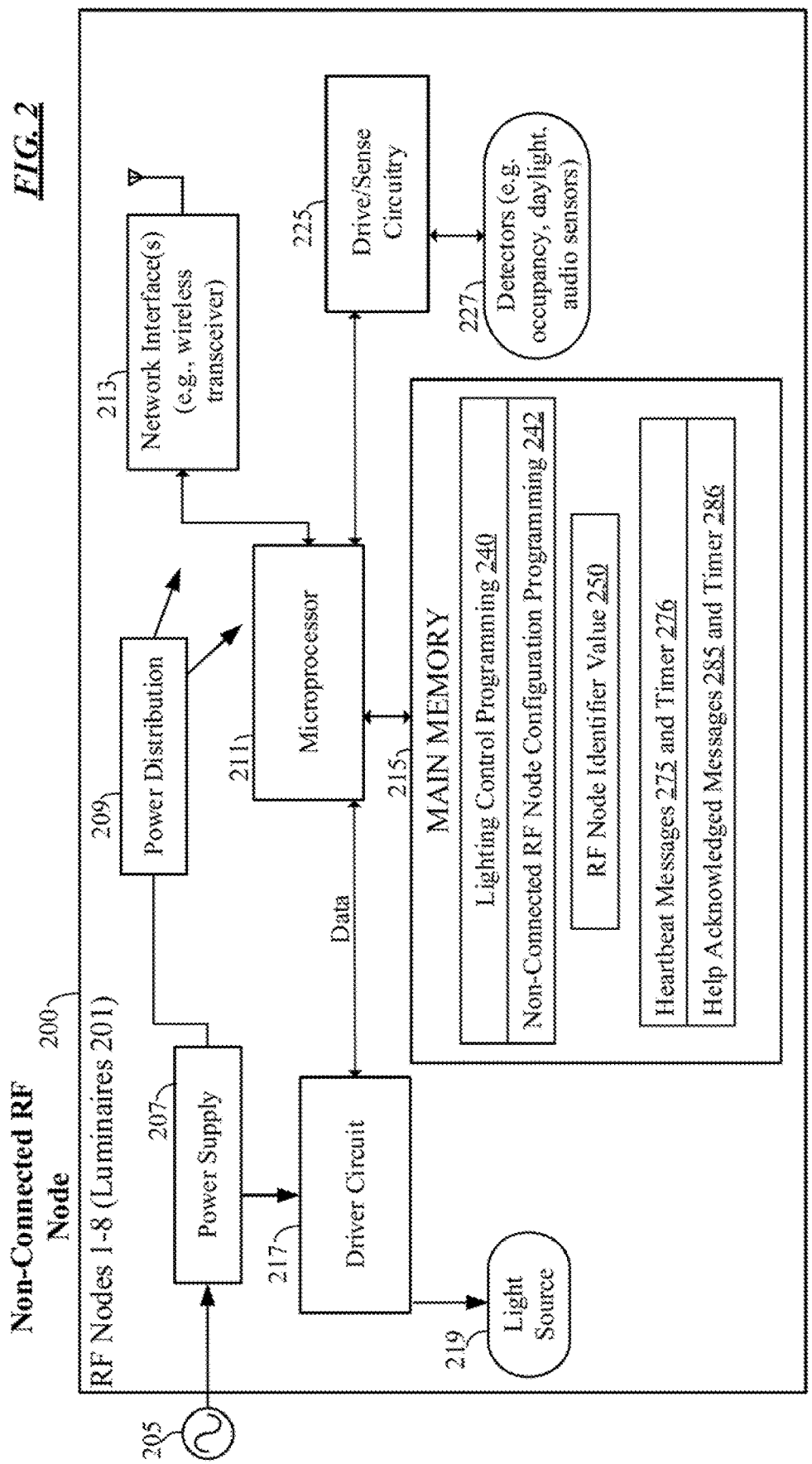

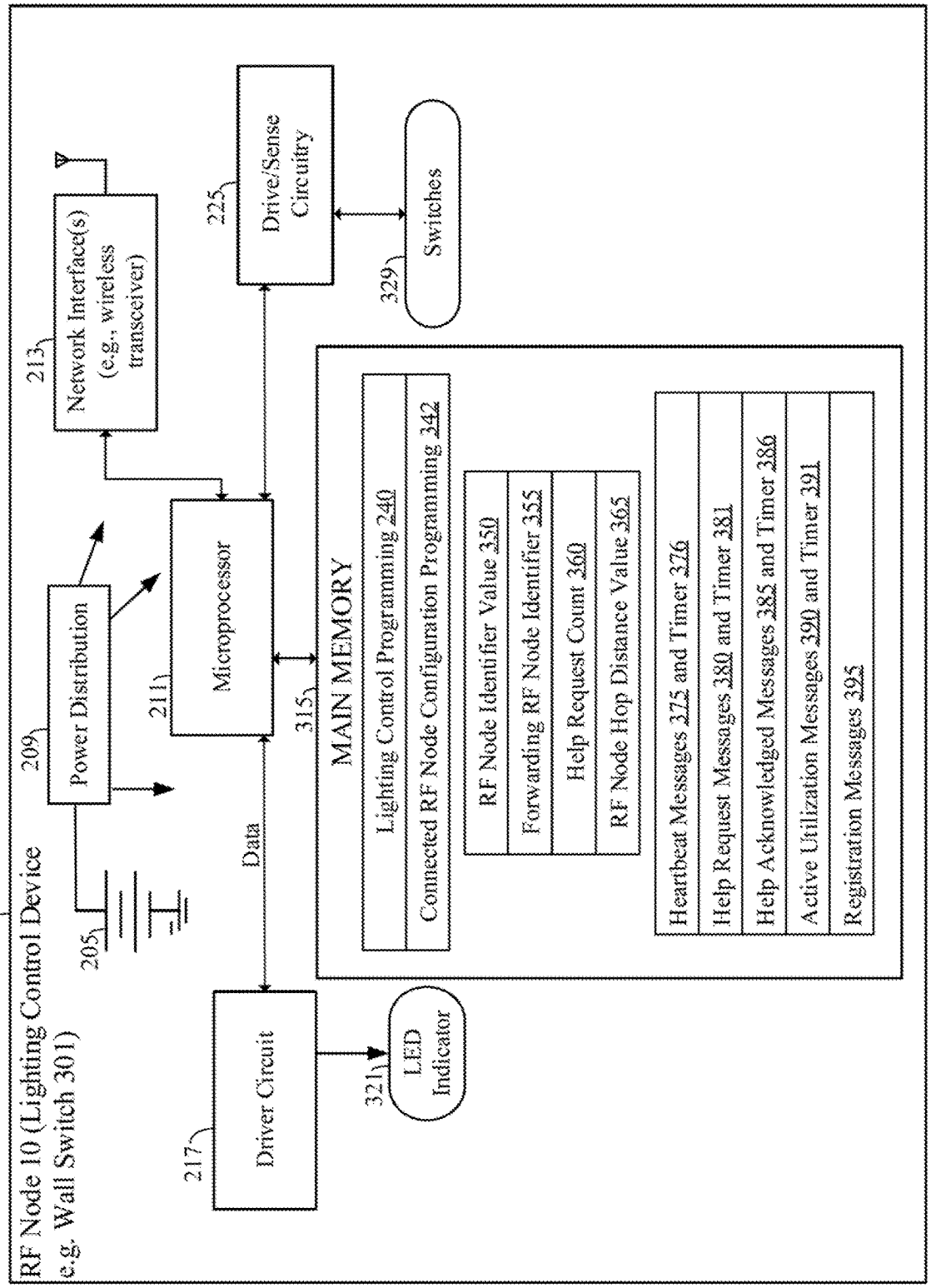

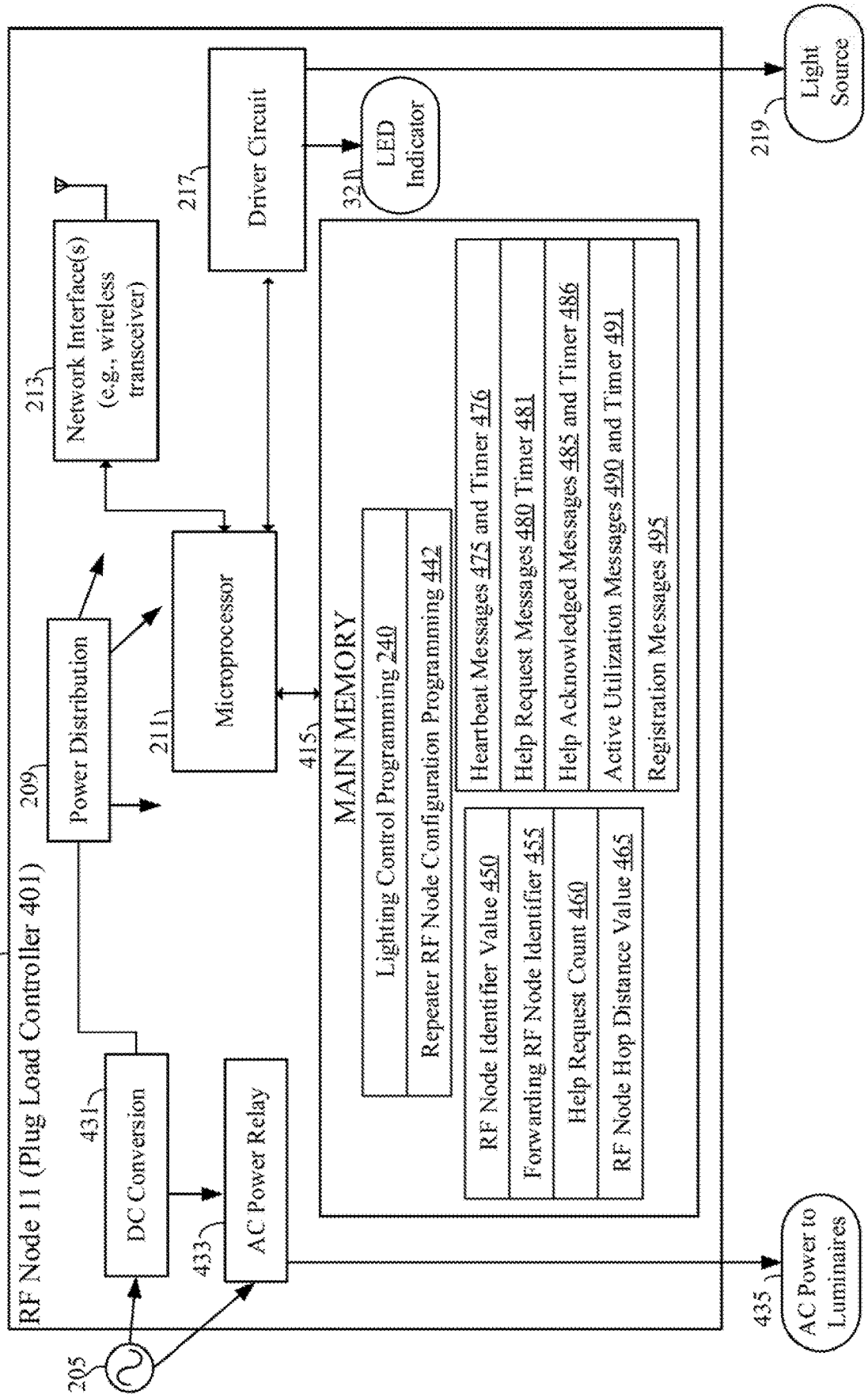

Non-Connected Heartbeat Connection Protocol 600

*FIG. 6*

Non-Connected RF Node 601A

The non-connected RF node powers on and begins listening for a heartbeat message from a heartbeat RF node: either the gateway RF node or a repeater RF node can fulfill the role of a heartbeat RF node. 625

Heartbeat RF Node 602

Non-Connected RF Node 601A

The heartbeat RF node sends a heartbeat message to the non-connected RF node, which contains identifying information for the heartbeat RF node, as well as any routing information to the gateway RF node if the heartbeat RF node is a repeater RF node. 630

Heartbeat RF Node 602

Non-Connected RF Node 601A

The non-connected RF node, having received a heartbeat message, sends a registration message to the gateway RF node, using the routing information found in the heartbeat message. The registration message contains identifying information for the non-connected RF node, as well as any routing information. The gateway RF node receives this information, and creates a routing record, containing the routing path between the gateway RF node and the non-connected RF node. 635

Gateway RF Node 9

Repeater RF Node 604

The gateway RF node sends back a registration acknowledgement message to the non-connected RF node, via the routing information, through the extended star network. If any repeater RF nodes are required to forward this message to the non-connected RF node, those repeater RF nodes make a copy of the routing information stored within the registration acknowledgement message. 640

Gateway RF Node 9

Connected RF Node 601B

Once the non-connected RF node receives this registration acknowledgement message, the non-connected RF node configures itself to act as a connected RF node. 645

Gateway RF Node 9

Non-Connected Help Request Connection Protocol 700

*FIG. 7*

 Non-Connected RF Node 701A

The non-connected RF node does not receive a heartbeat message, and therefore sends a help request message to the extended star network, specifically the connected RF nodes. 725

 Connected RF Node 702B

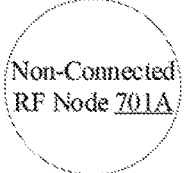 Non-Connected RF Node 701A

A connected RF node receives this help request message. The connected RF node has a running count of every RF node currently requesting help from itself, and responds to the help request with a help acknowledgement message, containing the identifying information of the connected RF node, as well as this running count of current help requests. 730

 Connected RF Node 702B

 Non-Connected RF Node 701A

The non-connected RF node, upon receiving a first help acknowledgement message, starts a countdown timer. At the end of the timer period, the non-connected RF node examines all of the help acknowledgement message the non-connected RF node has received since the timer started. The non-connected RF node then sends a registration message to the connected RF node that sent the highest running count of help requests from among all of the help acknowledgement message the non-connected RF node received. 735

 Connected RF Node 702B

 Gateway RF Node 9

The connected RF node, having received a registration message from the non-connected RF node, configures itself to act as a repeater RF node. The new repeater RF node then forwards the registration message to the gateway RF node. The gateway RF node receives the registration message, and creates a routing record, containing the routing path between the gateway RF node and the non-connected RF node. 740

 Repeater RF Node 702C

 Gateway RF Node 9

The gateway RF node sends back a registration acknowledgement message to the non-connected RF node, via the routing information, through the extended star network. The repeater RF node, and any other repeater RF nodes that are required to forward this message to the non-connected RF node, make a copy of the routing information stored within the registration acknowledgement message. 745

 Repeater RF Node 702C

 Connected RF Node 701B

The new repeater RF node forwards the registration acknowledgement message to the non-connected RF node. Once the non-connected RF node receives this registration acknowledgement message, the non-connected RF node configures itself to act as a connected RF node. 750

 Repeater RF Node 702C

Help Request Upgrade Protocol 800

FIG. 8

Help Requesting RF Node 801

A connected or repeater RF node is performing a periodic check to see if the connected or repeater RF node can move to a more popular node. Any node performing this check can be called a help requesting RF node. The help requesting RF node does this by sending help request messages to every connected or repeater RF node the help requesting RF node can directly contact. One of these nodes can be called a help acknowledging RF node.
825

Help Acknowledging RF Node 802

Help Requesting RF Node 801

A help acknowledging RF node receives this help request message. The help acknowledging RF node has a running count of every RF node currently requesting help from itself, and responds to the help request with a help acknowledgement message, containing the identifying information of the help acknowledging RF node, as well as this running count of current help requests.
830

Help Acknowledging RF Node 802

Help Requesting RF Node 801

The help requesting RF node, upon receiving a first help acknowledgement message, starts a countdown timer. At the end of the timer period, the help requesting RF node examines all of the help acknowledgement message the help requesting RF node has received since the timer started. The help requesting RF node then sends a registration message to the help acknowledging RF node that sent the highest running count of help requests from among all of the help acknowledgement message the help requesting RF node received.
835

Help Acknowledging RF Node 802

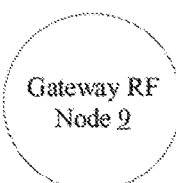
Gateway RF Node 2

The help acknowledging RF node, having received a registration message from the help requesting RF node, configures itself to act as a repeater RF node if the help acknowledging RF node is currently a connected RF node. The help acknowledging RF node then forwards the registration message to the gateway RF node. The gateway RF node receives this information, and updates the gateway RF node's routing record to contain the new routing path between the gateway RF node and the help requesting RF node.
840

Help Acknowledging RF Node 802

Gateway RF Node 2

The gateway RF node sends back a registration acknowledgement message to the help requesting RF node, via the routing information, through the extended star network. The help acknowledging RF node, and any other repeater RF nodes that are required to forward this message to the help requesting RF node, make a copy of the routing information stored within the registration acknowledgement message.
845

Help Acknowledging RF Node 802

Help Requesting RF Node 801

The help acknowledging RF node forwards the registration acknowledgement message to the help requesting RF node. 850

Help Acknowledging RF Node 802

FIG. 9

Heartbeat Upgrade Protocol 900

Network Connecting RF Node 901 → A connected or repeater RF node is performing a periodic check to see if the connected or repeater RF node can move to the gateway RF node, or to a repeater RF node closer to the gateway RF node. Any node performing this check can be called a Network Connecting RF Node. The network connecting RF node does this by collecting heartbeat messages from the gateway RF node and every repeater RF node that forward a heartbeat message. One of these heartbeat-sending nodes can be called a network connector RF node. ← Network Connector RF Node 902   925

Network Connecting RF Node 901 → A repeater RF node has a value stored counting every other repeater RF node required to forward messages from the repeater RF node to the gateway RF node. The heartbeat messages network connector RF nodes send out contain identifying information as well as the count of other repeaters required if they are a repeater node; or, if the network connector RF node is the gateway RF node, the network connector RF node only sends out the network connector RF node's own identifier, signaling that the network connector RF node has a distance from the gateway RF node of zero. ← Network Connector RF Node 902   930

Network Connecting RF Node 901 → The network connecting RF node, upon receiving a first heartbeat message, starts a countdown timer. At the end of the timer period, the network connecting RF node examines all of the heartbeat message the network connecting RF node has received since the timer started. The network connecting RF node then sends a registration message to the network connector RF node that sent the smallest distance from the gateway RF node value, from among all of the heartbeat message the network connecting RF node received. ← Network Connector RF Node 902   935

Gateway RF Node 2 ← The network connector RF node, having received a registration message from the network connecting RF node, forwards the registration message to the gateway RF node if it the network connector RF node is not the gateway RF node. The gateway RF node receives this information, and updates the gateway RF node's routing record to contain the new routing path between the gateway RF node and the network connecting RF node. ← Network Connector RF Node 902   940

Gateway RF Node 2 → The gateway RF node sends back a registration acknowledgement message to the network connecting RF node, via the routing information, through the extended star network. Any repeater RF nodes that are required to forward this message to the network connecting RF node, make a copy of the routing information stored within the registration acknowledgement message. → Network Connector RF Node 902   945

Network Connecting RF Node 901 ← The network connector RF node, if the network connector RF node is not the gateway RF node, forwards the registration acknowledgement message to the network connecting RF node.   950 ← Network Connector RF Node 902

Heartbeat Disconnect Protocol 1000

*FIG. 10*

Heartbeat Listener RF Node 1001B

A connected or repeater RF node is listening for a heartbeat message from either a repeater RF node, or the gateway RF node. Any connected or repeater RF node listening can be called a heartbeat listener RF Node, and the gateway RF node or repeater RF node to which the heartbeat listener RF node is directly connected to can be called a heartbeat RF node. 1025

Heartbeat RF Node 1002

Heartbeat Listener RF Node 1001B

While the heartbeat listener RF node is periodically receiving heartbeat messages from the heartbeat RF node, the heartbeat listener RF node knows the heartbeat listener RF node is connected to the network, and therefore needs to take no action. 1030

Heartbeat RF Node 1002

Non-Connected RF Node 1001A

Once the heartbeat listener RF node does not receive a heartbeat message for a period of time from the heartbeat RF node, the heartbeat listener RF node knows the heartbeat listener RF node is no longer connected to the network, and therefore configures itself to act as an non-connected RF node. 1035

Heartbeat RF Node 1002

Active Utilization Retirement Protocol 1100      *FIG. 11*

 Repeater RF Node 1101C | A repeater RF node is listening for an active utilization message from either a repeater RF node or connected RF node that uses the repeater RF node to connect to the rest of the extended star network. Any repeater RF node or connected RF node that uses the repeater RF node to connect to the rest of the extended star network can be called an active utilization RF node. 1125 |  Active Utilization RF Node 1102

 Repeater RF Node 1101C | While the repeater RF node is periodically receiving active utilization messages from an active utilization RF node, the repeater RF node knows the repeater RF node is needed by the active utilization RF node to remain connected to the network, and therefore the repeater RF node needs to take no action. 1130 |  Active Utilization RF Node 1102

 Connected RF Node 1101B | Once the repeater RF node does not receive an active utilization message for a period of time from any active utilization RF node, the repeater RF node knows the repeater RF node is no longer needed by any active utilization RF node to remain connected to the network, and therefore configures itself to act as an connected RF node. 1135 |  Active Utilization RF Node 1102

EXTENDED STAR LUMINAIRE NETWORK FORMED USING HEARTBEAT MESSAGES

BACKGROUND

Electrically powered artificial lighting for general illumination has become ubiquitous in modern society. Electrical lighting equipment is commonly deployed, for example, in homes, buildings of commercial and other enterprise establishments, as well as in various outdoor settings.

In conventional luminaires, the luminance output can be turned ON/OFF and often can be adjusted up or dimmed down. In some devices, e.g., using multiple colors of light emitting diode (LED) type sources, the user may be able to adjust a combined color output of the resulting illumination. The changes in intensity or color characteristic of the illumination may be responsive to manual user inputs or responsive to various sensed conditions in or about the illuminated space.

Conventional wall switches and light fixtures communicate over wired systems. More recent lighting systems are wireless, which allow communication over a radio frequency (RF) network; however, it is difficult to control these systems as the systems scale in size. Some wireless lighting communication control systems communicate over a routing mesh. In a routing mesh, network packets are addressed through the network one node to the next, as in A(B(D(F(E)))). If the network packet does not get through the network, the dropped network packet can be detected and a new route tried. One goal of a routing algorithm is to minimize duplicated messaging and streamlining communication through fewer nodes.

Some routing meshes use a star network. In a star network, every network packet sent from an outside source is sent by a gateway or hub RF node to the recipient RF node. Requiring that all messages pass through a single RF node fixes the maximum size of the routing mesh to within the range of the gateway RF node's radio strength Accordingly, a system is needed to overcome these and other limitations in the art. The described extended star luminaire network's algorithms optimize to reduce both the hop distance between any RF node and the gateway RF node, as well as reducing the number of RF nodes that process message hopping, improving the functionality of the lighting network.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2 illustrates a functional block diagram of a lighting system luminaire RF node configured to act as a non-connected RF node.

FIG. 3A illustrates a functional block diagram of a lighting system wall switch RF node configured to act as a connected RF node.

FIG. 4A illustrates a functional block diagram of a lighting system plug load controller RF node configured to act as a repeater RF node.

FIG. 6 is a ping pong diagram of a non-connected RF node connecting to the extended star wireless network by heartbeat message.

FIG. 7 is a ping pong diagram of a non-connected RF node connecting to the extended star wireless network by help request message.

FIG. 8 is a ping pong diagram of a connected or repeater RF node performing a periodic check to see if it can move to a more popular node.

FIG. 9 is a ping pong diagram of a connected or repeater RF node performing a periodic check to see if it can move to the gateway RF node, or to a repeater RF node closer to the gateway RF node.

FIG. 10 is a ping pong diagram of lost heartbeat signal.

FIG. 11 is a ping pong diagram of a lost active utilization signal.

DETAILED DESCRIPTION

Figure 1:
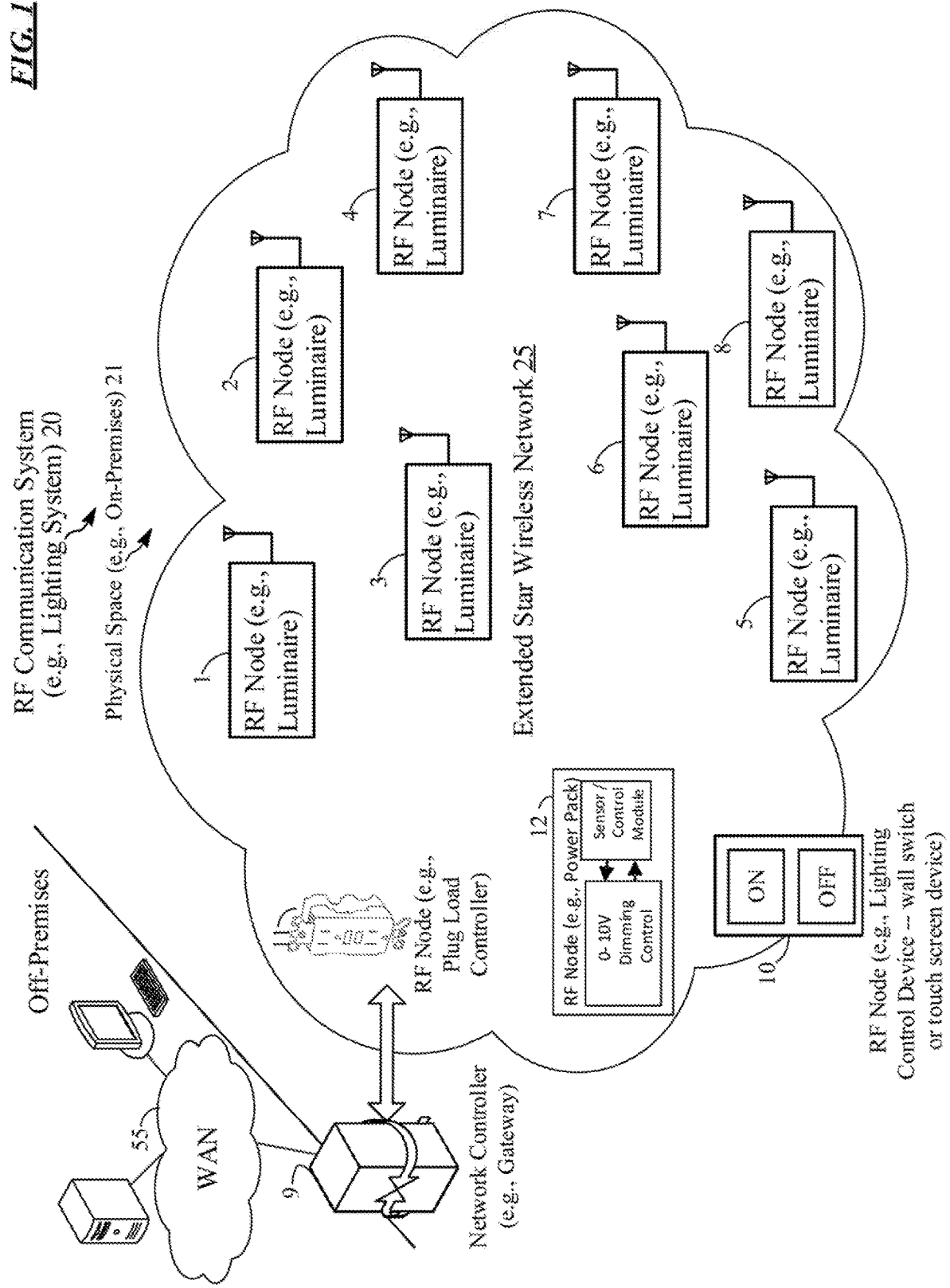
FIG. 1 illustrates a functional block diagram of an example of an RF communication system (e.g., wireless lighting system) that includes a flooding wireless network of RF nodes.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Although the discussion herein is focused on light fixture type luminaires that have a fixed position in a space, it should be understood that other types of luminaires can be used/sensed in lieu of light fixtures, such as lamps, particularly if the lamps have a fixed position in the space. The term "luminaire" as used herein, is intended to encompass essentially any type of device, e.g., a light fixture or a lamp, that processes energy to generate or supply artificial light, for example, for general illumination of a space intended for use of or occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaries in or on a particular premises have other lighting purposes, such as signage for an entrance or to indicate an exit. In most examples, the luminaire(s) illuminate a space of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

The "luminaire" can include other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). As noted, the lighting component(s) are located into an integral unit, such as a light fixture or lamp implementation of the luminaire. The electronics for driving and/or controlling the lighting component(s) may be incorporated within the luminaire or located separately and coupled by appropriate means to the light source component(s).

The term "lighting system," as used herein, is intended to encompass essentially any type of system that either includes a number of such luminaires coupled together for data communication and/or luminaire(s) coupled together for data communication with one or more control devices, such as wall switches, control panels, remote controls, central lighting or building control systems, servers, etc.

The illumination light output of a luminaire, for example, may have an intensity and/or other characteristic(s) that satisfy an industry acceptable performance standard for a general lighting application. The performance standard may vary for different uses or applications of the illuminated space, for example, as between residential, office, manufacturing, warehouse, or retail spaces. Any luminaire, however, may be controlled in response to commands received with the network technology of the lighting system, e.g. to turn the source ON/OFF, to dim the light intensity of the output, to adjust or tune color of the light output (for a luminaire having a variable color source), etc.

Terms such as "artificial lighting," as used herein, are intended to encompass essentially any type of lighting in which a luminaire produces light by processing of electrical power to generate the light. A luminaire for artificial lighting, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type.

Illumination light output from the light source of the luminaire may carry information, such as a code (e.g. to identify the luminaire or its location) or downstream transmission of communication signaling and/or user data. The light based data transmission may involve modulation or otherwise adjusting parameters (e.g. intensity, color characteristic or distribution) of the illumination light output of the light source of the light source of the luminaire.

Terms such as "lighting device" or "lighting apparatus," as used herein, are intended to encompass essentially any combination of an example of a luminaire discussed herein with other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). The electronics for driving and/or controlling the lighting component(s) may be incorporated within the luminaire or located separately and coupled by appropriate means to the light source component(s).

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Reference now is made in detail to the examples illustrated in the accompanying drawings and discussed below.

FIG. 1 illustrates a functional block diagram of an example of an RF communication system (e.g., wireless lighting system) 20 that includes an extended star wireless network 25 of radio frequency (RF) nodes. The extended star wireless network 25 supports light commissioning/control/maintenance to provide a variety of lighting control, including communications in support of turning lights on/off, dimming, set scene, and sensor trip events. In the example, the twelve RF nodes 1-12 include eight luminaires 1-8, a gateway (e.g., network controller) 9, lighting control device 10 (e.g., wall switch or touch screen device), a plug load controller 11, and a power pack 12. The number of RF nodes 1-12 in the extended star wireless network 25 (e.g., size) will vary as RF nodes join or leave the extended star wireless network 25; thus, the number of RF nodes may be greater or less than the twelve RF nodes shown.

RF nodes 1-12 can execute non-connected and connected configuration programming (elements 242, 342 of FIGS. 2, 3A-B) to designate RF non-connected and connected nodes of the extended star wireless network 25 and a lighting control application (element 240 of FIGS. 2, 3A-B) for communication over the extended star wireless network 25. In the example, RF nodes 1-8 are each a non-connected RF node (see element 200 of FIG. 2), RF node 10 is a connected RF node (see elements 300A-B of FIG. 3A-B), network controller 9 is a gateway RF node (see element 9 of FIG. 5), and RF nodes 11-12 are each a repeater RF node (see elements 400A-B of FIG. 4A-B). In an extended star wireless network 25, algorithms are used to designate certain RF nodes as repeater RF node(s) 400, which are capable of forwarding network packets from the gateway or other repeater RF nodes to recipient RF nodes. The number of non-connected RF nodes, connected RF nodes, gateway RF nodes, and repeater RF nodes will vary depending on the RF signal strength in various locations of the physical space 21 where the RF nodes 1-12 are positioned.

In a lighting system 20, where various luminaires 201, lighting control devices (e.g., wall switch 301 or touch screen device 302)), plug load controllers 401, and power packs 402 are RF nodes 1-12, running messaging forwarding programming can be expensive in terms of processing time and electrical energy, even while no messages are being sent. Therefore, the extended star wireless network 25 benefits from having as few RF nodes 1-12 running the repeater programming as possible, in order to conserve energy and processing time across the entire extended star wireless network.

Additionally, the act of forwarding itself takes time as the repeater RF node (element 400 of FIGS. 4A-B) processes incoming messages and properly routes them out. Therefore, the extended star wireless network 25 benefits substantially from every RF node 1-12 having as few repeater RF nodes (element 400 of FIGS. 4A-B) as possible between the gateway node (element 9 of FIG. 5), and any other given RF node.

Connected RF nodes are RF nodes that have access to the extended star wireless network 25 and have connected that fact with the gateway 9. RF nodes that are incapable of communicating with the gateway 9, either directly or via a repeater node (element 4004 of FIGS. 4A-B), are considered non-connected nodes (element 200 of FIG. 2). The non-connected RF nodes (element 200 of FIG. 2) cannot communicate with the extended star wireless network 25, even though they may be within the physical space 21. This may be due to the non-connected node (element 200 of FIG. 2) being out of range of the gateway 9 (element 9 of FIG. 5) or a repeater RF node (element 400 of FIG. 2C), damage to the non-connected node (element 200 of FIG. 2), or perhaps local electrical interference.

RF nodes 1-12 can also execute repeater configuration programming (element 442 of FIGS. 4A-B) to designate RF repeater nodes of the extended star wireless network 25 and a lighting control application (element 240 of FIGS. 4A-B) for communication over the extended star wireless network 25. RF nodes 1-12 are installed in a physical space (e.g., on-premises) 21, which can be in indoor or outdoor installation area.

Each RF node, such as luminaires 1-8, gateway 9, lighting control device 10, plug load controller 11, and power pack 12 can be equipped with a wireless network transceiver. For example, the wireless network transceiver can include a near range Bluetooth Low Energy (BLE) radio that communicates over the extended star wireless network 25 for purposes of commissioning, maintenance, and control operation of the lighting system 20.

Plug load controller 11 plugs into existing AC wall outlets, for example, and allows existing wired lighting devices, such as table lamps or floor lamps that plug into a wall outlet, to operate in the lighting system 20. Plug load controller 11 instantiates a wired lighting device, such as a table lamp or floor lamp, by allowing for commissioning and maintenance operations and processes wireless lighting controls in order to the allow the wired lighting device to operate in the lighting system 20.

Power pack 12 retrofits with existing wired light fixtures (luminaires). Power pack 12 instantiates the wired light fixture by allowing for commissioning and maintenance operations and processes wireless lighting controls in order to allow a wired lighting device to operate in the lighting system 20.

It should be understood that in the example herein, the luminaires 1-8, gateway 9, lighting control device 10, plug load controller 11, and power pack 12 are just one example of an RF node, which includes additional components. Hence, the non-connected 242, connected 342, and repeater configuration programming 442 of FIGS. 2, 3A-B, 4A-B described herein can be applied to various other types of RF nodes.

Generally, RF nodes 1-12 include a subset of components, for example, as shown in FIGS. 2, 3A-B, 4A-B, and 5 the RF node includes a wireless transceiver 213, microprocessor 211, and a memory 215, 315, 415, 515. However, the programming, messages, etc. stored in the main memory 215, 315, 515 varies depending on whether the RF node 1-12 is configured as a non-connected RF node 200, connected RF node 300A-B, repeater RF node 400A-B, and gateway RF node 9. Hence, the RF nodes 1-12 do not have to include the light source 219, LED indicator 321, touch screen 323, driver circuit 217, drive/sense circuitry 225, detector(s) 227, and switch(es) 329 components. An RF node 1-12 can also implement the gateway RF node 9 of FIG. 5 and thus may include components like that shown in FIG. 5 for the gateway RF node 9. A wireless beacon is an example of an RF node that is a chip with a radio that emits a signal with a certain signal strength, small packets of information, and has an RF positioning node identifier. RF nodes can be connected together via the extended star wireless network 25.

FIG. 2 is a block diagram of RF nodes 1-8, which are luminaire(s) 201 in the example. In this example of FIG. 2, each of the RF nodes 1-8 are configured as a non-connected RF node 200 that communicates via the extended star wireless network 25 in the lighting system of FIG. 1. The non-connected RF node 200 includes a subset of the components of the luminaire RF node 201 of FIG. 2, including the microprocessor 211, network interface(s) 213, and various programming, messages, identifiers, etc. shown in the main memory 215. In FIG. 2, drive/sense circuitry 225 and detectors 227 can be on-board the luminaire RF node 201. Detectors 227 can be infrared sensors for occupancy or motion detection, an in-fixture daylight sensor, an audio sensor, a temperature sensor, or other environmental sensor. Drive/sense circuitry 225, such as application firmware, drives the occupancy, audio, and photo sensor hardware.

The luminaire RF node 201 includes a power supply 207 driven by a power source 205. Power supply 207 receives power from the power source 205, such as an AC mains, battery, solar panel, or any other AC or DC source. Power supply 207 may include a magnetic transformer, electronic transformer, switching converter, rectifier, or any other similar type of circuit to convert an input power signal into a power signal suitable for light source 219. Light source 219 includes electrical-to-optical transducers include various light emitters, although the emitted light may be in the visible spectrum or in other wavelength ranges. Suitable light generation sources include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used. For example, it should be understood that non-micro versions of the foregoing light generation sources can be used.

A lamp or "light bulb" is an example of a single light source. An LED light engine may use a single output for a single source but typically combines light from multiple LED type emitters within the single light engine. Light source 219 can include light emitting diodes (LEDs) that emit red, green, and blue (RGB) light or tunable white light. Many types of light sources provide an illumination light output that generally appears uniform to an observer, although there may be some color or intensity striations, e.g. along an edge of a combined light output. For purposes of the present examples, however, the appearance of the light source output may not be strictly uniform across the output area or aperture of the source. For example, although the source may use individual emitters or groups of individual emitters to produce the light generated by the overall source; depending on the arrangement of the emitters and any associated mixer or diffuser, the light output may be relatively uniform across the aperture or may appear pixelated to an observer viewing the output aperture. The individual emitters or groups of emitters may be separately controllable, for example to control intensity or color characteristics of the source output.

Luminaire RF node 201 further includes, a driver circuit 217, for example, an intelligent light emitting diode (LED) driver circuit. Driver circuit 217 is coupled to light source 219 and drives that light source 219 by regulating the power to light source 219A by providing a constant quantity or power to light source 219 as its electrical properties change with temperature, for example. The driver circuit 217 provides power to light source 219. Driver circuit 217 may be a constant-voltage driver, constant-current driver, or AC LED driver type circuit that provides dimming through a pulse width modulation circuit and may have many channels for separate control of different LEDs or LED arrays that comprise light source 219. An example of a commercially available intelligent LED driver circuit 217 is manufactured by EldoLED®.

Driver circuit 217 can further include an AC or DC current source or voltage source, a regulator, an amplifier (such as a linear amplifier or switching amplifier), a buck, boost, or buck/boost converter, or any other similar type of circuit or component. Driver circuit 217 outputs a variable voltage or current to the light source 219 that may include a DC offset, such that its average value is nonzero, and/or an AC voltage.

For purposes of communication and control, luminaire RF node 201 is treated as a single or a multi-addressable device that can be configured to operate as a member of the extended star wireless network 25. Luminaire RF node 201 includes power distribution circuitry 209, a microprocessor 211, and a memory 215. As shown, microprocessor 211 is coupled to driver circuit 217 and the microprocessor 211 includes a central processing unit (CPU) that controls the light source operation of the light source 219. Memory 215 can include volatile and non-volatile storage.

The power distribution circuitry 209 distributes power and ground voltages to the processor 211A, memory 215, network communication interface(s) 213 (e.g., wireless transceivers), drive/sense circuitry 225, and detector(s) 227 to provide reliable operation of the various circuitry on the luminaire RF node 201.

Network communication interface(s) 213 allows for data communication (e.g., wired or wireless) over various networks, including the extended star wireless network 25. For example, luminaire RF node 201 can includes one band, dual-band, or tri-band wireless radio communication interface system of network communication interface(s) 213 configured for wireless communication via separate radios that operate at three different frequencies, such as sub-GHz (e.g., 900 MHz), Bluetooth Low Energy (BLE) (2.4 GHz), and 5 GHz, for example. At least one wireless transceiver 213 is for communication over the extended star wireless network 25.

Figure 5:
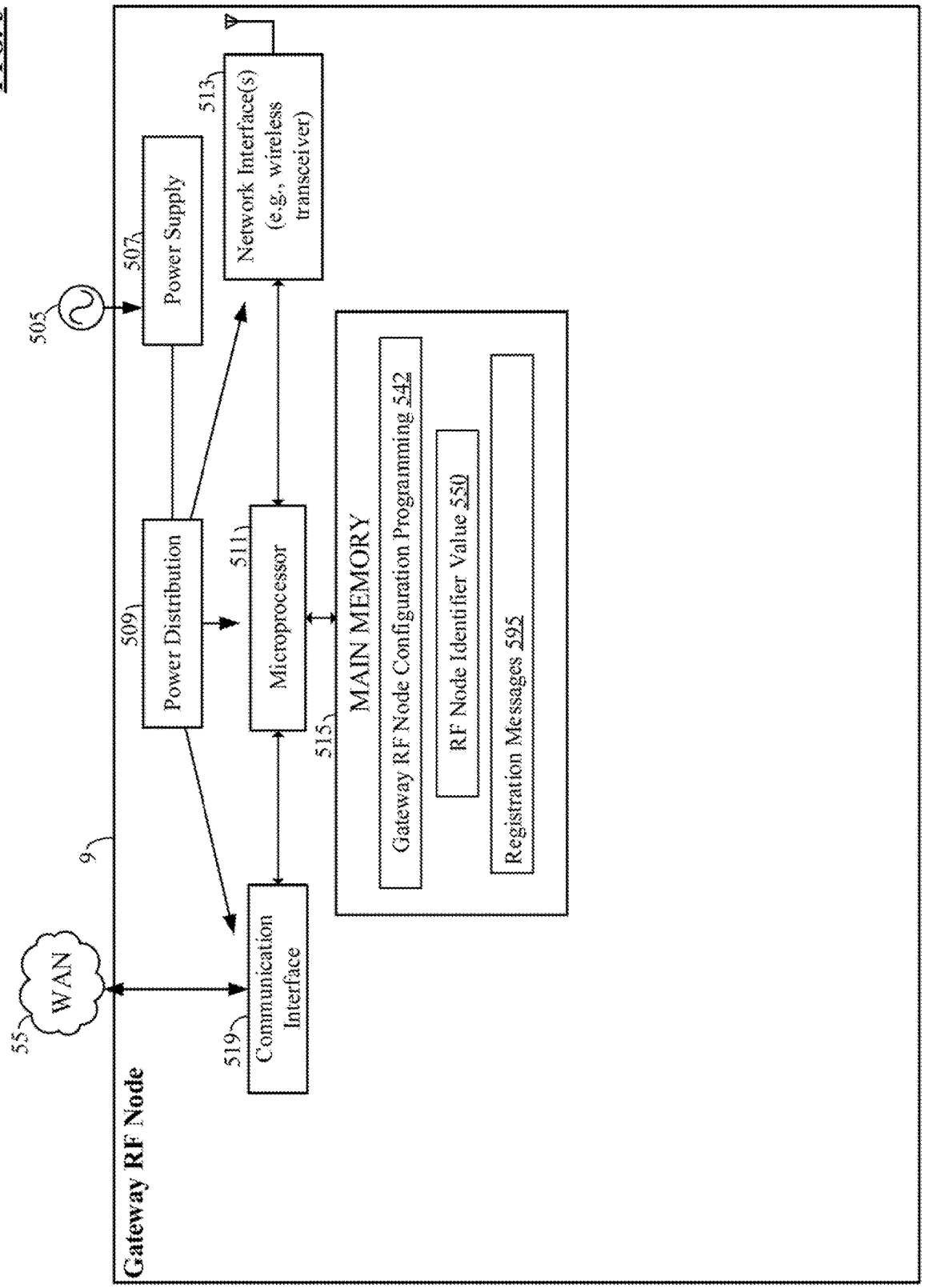
FIG. 5 illustrates a functional block diagram of a gateway RF node.

Microprocessor 211, including like that shown for the processor/CPU 511 of gateway 9 in FIG. 5, serve to perform various operations, for example, in accordance with instructions or programming executable by processors 211, 511. For example, such operations may include operations related to communications with various lighting system 20 elements, such as RF nodes 1-12 during the registration and repeater designation procedures described herein. Although a processor 211, 511 may be configured by use of hardwired logic, typical processors are general processing circuits configured by execution of programming. Processors 211, 511 include elements structured and arranged to perform one or more processing functions, typically various data processing functions. Although discrete logic components could be used, the examples utilize components forming a programmable CPU. A processor 211, 511 for example includes one or more integrated circuit (IC) chips incorporating the electronic elements to perform the functions of the CPU. The processors 211, 511 for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in RF nodes 1-12.

Memory 215 like that shown in FIGS. 2, 3A-B, 4A-B and memory 515 like that shown in FIG. 5 are for storing data and programming. In the example, the main memory system 215, 515 may include a flash memory (non-volatile or persistent storage) and a random access memory (RAM) (volatile storage). The RAM serves as short term storage for instructions and data being handled by the processor 211, 511, e.g., as a working data processing memory. The flash memory typically provides longer term storage.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The instructions, programming, or application(s) may be software or firmware, e.g., executable by a microcontroller (e.g., including a processor and memory), used to implement device functions associated with various types of RF nodes 1-12 of the RF communication system 20, including non-connected RF node 200, connected RF nodes 300A-B, repeater RF nodes 400A-B, and gateway RF node 9. Functions of the non-connected RF node 200, connected RF nodes 300A-B, repeater RF nodes 400A-B, and gateway RF node 9 can be embodied in any of the devices of a lighting system, such as luminaire 201, wall switch 301, touch screen device 302, plug load controller 401, and power pack 402. It should be noted that a digital signal processor (DSP) or field-programmable gate array (FPGA) could be suitable replacements for the microcontroller. Program aspects of the technology may be thought of as "products" or "articles of manufacture" typically in the form of executable code or process instructions and/or associated data that is stored on or embodied in a type of machine or processor readable medium (e.g., transitory or non-transitory), such as memory 215, 515, or a memory of a computer used to download or otherwise install such programming into the RF nodes 1-12, or a transportable storage device or a communications medium for carrying program for installation in the RF nodes 1-12.

As shown, the luminaire 200 includes programming in the memory 215, which configures the processor 211 to control operations of the light source 219, including the communications over the network communication interface(s) 213 via the wireless network interface(s) 213. The programming in the memory 215 also includes lighting control programming 240 to control the light source 219.

This luminaire RF node 201 is configured to operate as a non-connected RF node 200. The luminaire RF node 201 could be configured to operate as a connected RF node 300, or a repeater RF node 400: the distinction between non-connected 200, connected 300, and repeater RF nodes 400 is entirely within the memory 215: changing between registration states does not add or remove hardware components such as the light source 219, detectors 227, LED indicators 321, or AC power relay 433.

This exemplar luminaire RF node 201 includes non-connected RF node configuration programming 242 to configure the luminaire RF node 201 to behave as a non-connected RF node 200. The non-connected RF node configuration programming 242 configures the non-connected RF node 200 to implement the non-connected heartbeat connection protocol 600 of FIG. 6, as well as the non-connected help request connection protocol 700 of FIG. 7. The memory 215 also stores an RF node identifier 250 of the non-connected RF node 200 itself.

The memory 215 further comprises heartbeat messages (e.g., repeater or gateway status messages 275), a heartbeat message timer 276, help acknowledgement messages (e.g., connected node and repeater node status with connection number response messages 285), and a help acknowledgement message timer 286.

Execution of the non-connected RF node configuration programming 242 by the processor 211 configures the non-connected RF node 200 to perform the following functions, including functions required to establish the extended star wireless network 25 that a non-connected RF node 200 is responsible for, such as connecting to the extended star wireless network 25 after receiving a heartbeat message. First, after being powered on by a power source 205, the non-connected RF node 200 receives, via the extended star wireless network 25, a gateway heartbeat message that the gateway RF node 99 transmits, or a respective repeater RF node 400 heartbeat message that a respective repeater RF node 400 of the repeater RF nodes 400 transmits. Second, in response to receiving the gateway heartbeat message that the gateway RF node 9 transmits, the non-connected RF node 200 transmits, via the extended star wireless network 25, a non-connected registration message to the gateway RF node 9. Alternatively, in response to receiving the respective repeater RF node heartbeat message that the respective repeater RF node 400 transmits, the non-connected RF node 200 transmits, via the extended star wireless network 25, the non-connected registration message to the respective repeater RF node 400. Third, in response to receiving a gateway or repeater registration acknowledgement message, via the extended star wireless network 25, that the gateway RF node 9 or the respective repeater RF node 400 transmits, the non-connected RF node 200 configures the non-connected RF node 200 to act as one of the connected RF nodes 300.

The non-connected RF node configuration programming 242 may further configure the non-connected RF node 200 to perform the following functions, including functions required to connect to the extended star wireless network 25 when a heartbeat message is not received. First, after waiting a first period of time, in response to not receiving the gateway heartbeat message or the respective repeater RF node heartbeat message, the non-connected RF node 200 transmits, via the extended star wireless network 25, a non-connected help request message to the connected RF nodes 300. Second, after transmitting the non-connected help request message, the non-connected RF node 200 receives, via the extended star wireless network 25, a respective connected help acknowledgement message from a respective connected RF node 300 of the connected RF nodes 300, the respective connected help acknowledgement message including a respective connected RF node identifier 350 of the respective connected RF node 300, and a respective connected help request count 360 of the respective connected RF node 300. In some examples, only connected RF nodes which are not already acting as repeater RF nodes will transmit a connected help acknowledgement message upon receipt of a connected help request message. Third, in response to receiving the respective connected help acknowledgement message from the respective connected RF node 300, the non-connected RF node 200 stores in the non-connected RF node memory 215 a potential repeating RF node record for the respective connected RF node record that includes the connected RF node identifier 350 included in the respective connected help acknowledgement message, and the connected help request count 360 identifier included in the respective connected help acknowledgement message. Fourth, after storing the potential repeating RF node record, the non-connected RF node 200 waits a second period of time, then select as a potential repeating RF node, the respective connected RF node 300 with the respective potential repeating RF node record having a highest connected help request count 360. Fifth, in response to selecting the potential repeating RF node, the non-connected RF node 200 transmits a registration message to the respective connected RF node 300 identifier of the potential repeating RF node.

Figure 3B:
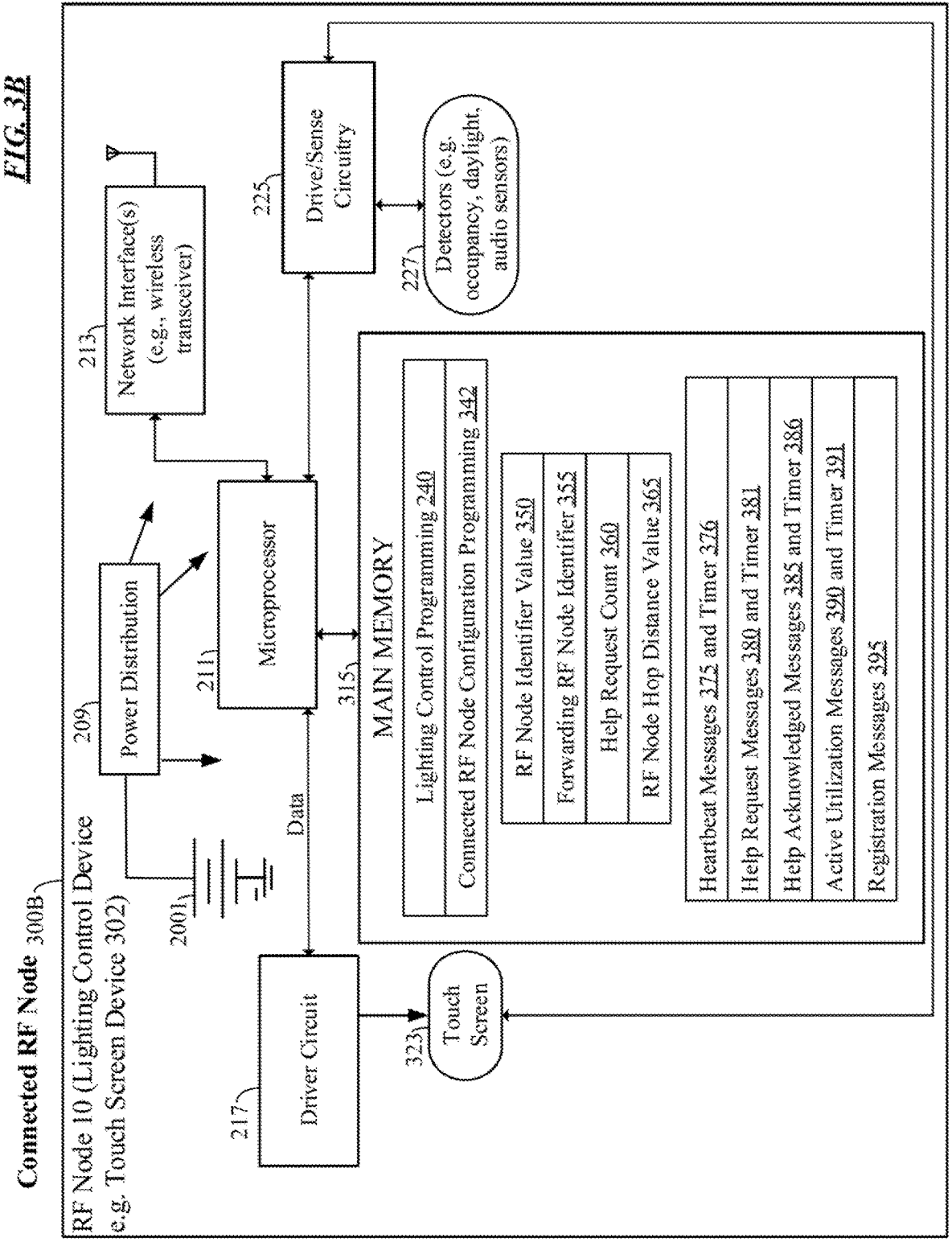
FIG. 3B illustrates a functional block diagram of a lighting system touch screen device RF node configured to act as a connected RF node.

FIGS. 3A-B are block diagrams of two types of lighting control devices 10 that communicate via the flooding wireless network 25 of FIG. 1, specifically a wall switch 301 and touchscreen device 323. These control devices 10 are also currently configured to act as connected RF nodes 300, and have the requisite elements to perform their necessary functions in the memory 315. The circuitry, hardware, and software of the lighting control devices 301-302, shown are similar to the luminaire 201, including the memory 315, to implement the connected RF node protocols 800, 900, 1000 described herein. Hence, main memory 315 is shown as including the lighting control programming 240.

This wall switch RF node 301 is configured to operate as a connected RF node 300. The wall switch RF node 301 could be configured to operate as a non-connected RF node 200, or a repeater RF node 400: the distinction between non-connected 200, connected 300, and repeater RF nodes 400 is entirely within the memory 315: changing between registration states does not add or remove hardware components such as the light source 219, detectors 227, LED indicators 321, or AC power relay 433. The connected RF node 300A-B includes a subset of the components of the wall switch 301 and touch screen device 302 of FIGS. 3A-B, including the microprocessor 211, network interface(s) 213, and various programming, messages, identifiers, etc. shown in the main memory 315.

This exemplar wall switch RF node 301 includes connected RF node configuration programming 342 to configure the wall switch RF node 301 to behave as a connected RF node 300A. The memory 315 includes the connected RF node configuration programming 342, RF node identifier value 350, forwarding RF node identifier 355, help request count 360, RF node hop distance value 365, heartbeat message 375 and timer 376, help request messages 380 and timer 381, help acknowledged messages 385 and timer 386, active utilization messages 390 and timer 391, and registration messages 395. However, as shown, wall switch 301 and touchscreen device 302 can include a subset of the circuitry, hardware, and software shown for the luminaire 201 of FIG. 2.

As shown in FIG. 3A, the RF node 10 is a wall switch 301 where the drive/sense circuitry 225 responds to switches 329. Switches 329 can be an on/off switch, dimmer switch, or set scene switch based on Acuity Brands Lighting's commercially available nLight® AIR rES7 product. In some examples, wall switch 301 includes a single shared button switch 329 for on/off, dimming, or set scene functions and the LED indicator 321 of wall switch 301. A button station can include various button settings that can have the lighting control settings adjusted, for example, four buttons can be arranged with two longitudinal buttons (north-south) and two lateral buttons (east-west).

In FIG. 3B, the RF node 10 is a touchscreen device 302 where lighting control setting adjustments are inputted via a user interface application (not shown) through manipulation or gestures on a touch screen 323. For output purposes, the touch screen 323 includes a display screen, such as a liquid crystal display (LCD) or light emitting diode (LED) screen or the like. For input purposes, touch screen 323 includes a plurality of touch sensors.

A keypad may be implemented in hardware as a physical keyboard of touch screen device 302, and keys may correspond to hardware keys of such a keyboard. Alternatively, some or all of the keys (and keyboard) of touchscreen device 300B may be implemented as "soft keys" of a virtual keyboard graphically represented in an appropriate arrangement via touch screen 323. The soft keys presented on the touch screen 323 may allow the user of touchscreen device 302 to invoke the same user interface functions as with the physical hardware keys.

Drive/sense circuitry 225 is coupled to touch sensors of touch screen 323 for detecting the occurrence and relative location/position of each touch with respect to a content display area of touch screen 323. In this example, drive/sense circuitry 225 is configured to provide processor 211 with touch-position information based on user input received via touch sensors. In some implementations, processor 211 is configured to correlate the touch position information to specific content being displayed within the content display area on touch screen 323. The touch-position information captured by the drive/sense circuitry 225 and provided to processor 211 may include, but is not limited to, coordinates identifying the location of each detected touch with respect to the display area of touch screen 323 and a timestamp corresponding to each detected touch position.

In general, touch screen 323 and its touch sensors (and one or more keys, if included) are used to provide a textual and graphical user interface for the touchscreen device 300B. In an example, touch screen 323 provides viewable content to the user at lighting control device 10. Touch screen 323 also enables the user to interact directly with the viewable content provided in the content display area, typically by touching the surface of the screen with a finger or an implement such as a stylus.

Main memory 315 is shown as including the lighting control programming 240, connected RF node configuration programming 342, RF node identifier 350 of the connected RF node 300B, heartbeat messages 375, a heartbeat timer 376, help acknowledgement messages 385, and a help acknowledgement message timer 386.

This exemplar touch screen RF node 302 includes connected RF node configuration programming 342 to configure the touch screen RF node 302 to behave as a connected RF node 300B. The memory 315 includes the connected RF node configuration programming 342, RF node identifier value 350, forwarding RF node identifier 355, help request count 360, RF node hop distance value 365, heartbeat message 375 and timer 376, help request messages 380 and timer 381, help acknowledged messages 385 and timer 386, active utilization messages 390 and timer 391, and registration messages 395. However, as shown, wall switch 301 and touchscreen device 302 can include a subset of the circuitry, hardware, and software shown for the luminaire 201 of FIG. 2.

The main memory 315 of a connected RF node 300 includes, in addition to the elements similar to the non-connected RF node 200, a forwarding RF node identifier 355, which includes the RF node identifier of either the gateway RF node 9, or the closest repeater RF node 400 that the connected RF node 300 needs to utilize in order to properly send messages to the gateway RF node 9 via the extended star wireless network 25. The memory 315 further includes a count of every other RF node 200, 300, 400 that is asking this connected RF node 300 to potentially help it connect to the extended star wireless network 25. A value 365 representing the distance between this connected RF node 300 and the gateway RF node 9 is also stored. The memory 315 additionally includes help request messages (e.g., RF node connection request messages 380), and a help request message timer 381.

Execution of the connected RF node configuration programming 342 by the processor 211 configures the connected RF node 300A (e.g., lighting control device, such as wall switch 301) to perform the following functions, including functions required to establish the extended star wireless network 25 that the connected RF node 300A is responsible for, such as helping non-connected RF nodes 200 that cannot find a heartbeat message connect to the extended star wireless network 25. First, the connected RF node 300A stores a repeater RF node identifier 450 of a respective repeater RF node 400 with a lower repeater hop distance value 465 to which the connected RF node 300 can directly transmit a message, or a gateway RF node identifier 550 of the gateway RF node 9 to which the connected RF node 300A can directly transmit a message, as a connected forwarding RF node identifier 355. Second, the connected RF node 300A stores a connected help request count 360 as the number of non-connected RF nodes 200, connected RF nodes 300, and repeater RF nodes 400 negotiating with the connected RF node 300. Third, the connected RF node 300A transmits a connected active utilization message to the connected forwarding node identifier 355. Fourth, in response to receiving a non-connected, connected, or repeater help request message, via the extended star wireless network 25, that a respective non-connected RF node 200, another connected RF node 300B, or repeater RF node 400 transmits, the connected RF node 300A increments the connected help request count 360, and transmits a connected help acknowledgement message to the respective non-connected RF node 200, other connected RF node 300B, or repeater RF node 400 that includes the connected RF node identifier 350, and the connected help request count 360. Fifth, in response to receiving a registration message, via the extended star wireless network 25, that the respective non-connected RF node 200, connected RF node 300A, or repeater RF node 400 transmits, the connected RF node 300A transmits the registration message to the connected forwarding RF node identifier 355. Sixth, in response to receiving the gateway acknowledgement message or the repeater registration acknowledgement message, via the extended star wireless network 25, the connected RF node 300A configures the connected RF node 300A to act as a repeater RF node 200. Alternatively, after waiting a first period of time, in response to not receiving the gateway heartbeat message or the repeater RF node heartbeat message, the connected RF node 300A configures the connected RF node 300A to act as a non-connected RF node 200.

The connected RF node configuration programming 342 may further configure the connected RF node 300A to perform the functions required to reduce the connected RF node's 300 distance to the gateway RF node 9. First, the connected RF node 300A receives a respective gateway or repeater heartbeat message, via the extended star wireless network 25, that the gateway RF node 9 or a respective repeater RF node 400 transmits. Second, in response to receiving the respective gateway or repeater heartbeat message, the connected RF node 300A stores in the connected RF node memory 315 a potential connected flood network connector record for the respective heartbeat message that includes the gateway RF node identifier 550 or repeater RF node identifier 450 included in the respective gateway or repeater heartbeat message as a connected heartbeat identifier, and the repeater RF node hop distance value 465 included in the respective repeater heartbeat message as a connected heartbeat distance value. Third, after storing the respective potential connected flood network connector record, the connected RF node 300A waits a second period of time, then selects as a potential connected flood network connector, the gateway 9 or repeater RF node 400 with the potential connected flood network connector record having a lowest connected heartbeat distance value 465. Fourth, in response to selecting the potential connected flood network connector record, the connected RF node 300A transmits a connected registration message to the gateway RF node identifier 550 or repeater RF node identifier 450 of the potential connected flood network connector.

The connected RF node configuration programming 442 may additionally configure the connected RF node 300A to perform the functions required to move the connected RF node 300A from a repeater RF node 400 with low utilization by other RF nodes 200, 300, 400 to a repeater RF node 400 with higher utilization by other RF nodes 200, 300, 400. First, the connected RF node 300A transmits, via the extended star wireless network 25, a connected help request message to the RF nodes 200, 300, 400. Second, after transmitting the connected help request message, the connected RF node 300A receives, via the extended star wireless network 25, a respective help acknowledgement message from a sender RF node. The sender RF node can include a connected RF node 300B or a repeater RF node 400A-B. The respective help acknowledgement message includes a respective connected RF node identifier 350 or repeater RF node identifier 450 of the respective sender connected RF node 300B or repeater RF node 400A-B, and a respective connected 360 or repeater help request count 460. Third, in response to receiving the respective help acknowledgement message from the respective sender RF node, the connected RF node 300A stores in the connected RF node memory 315 a respective potential connected repeating RF node record for the respective sender RF node record that includes the respective connected 350 or repeater RF node identifier 450, and the respective connected 360 or repeater help request count 460. Fourth, after storing the respective potential connected repeating RF node record, connected RF node 300A waits a third period of time, then selects as a potential connected repeating RF node, the respective connected RF node 300B or repeater RF node 400A-B with the respective potential connected repeating RF node record having a highest connected 360 or repeater help request count 460. Finally, fifth, in response to selecting the potential connected repeating RF node, connected RF node 300A transmits a registration message to the respective connected 350 or repeater RF node identifier 450 of the potential connected repeating RF node.

The connected RF node configuration programming 342 may yet further configure the connected RF node 300 to modify how the connected RF node 300 sends active utilization messages. After storing the connected RF node hop distance value 365 representing an indirect connection to the gateway RF node 9, transmitting an active connected utilization message to the forwarding node identifier 355.

FIG. 4A is a block diagram of a plug load controller 401 type of RF node 11 that communicates via the flooding wireless network 25 of FIG. 1 and is configured as a first repeater RF node 400A. The circuitry, hardware, and software of plug load controller 401 shown is similar to the luminaire 201 of FIG. 2. Hence, main memory 415 is shown as including the lighting control programming 240.

This plug load controller RF node 401 is configured to operate as a repeater RF node 400. The plug load controller RF node 401 could be configured to operate as a non-connected RF node 200, or a connected RF node 300: the distinction between non-connected 200, connected 300, and repeater RF nodes 400 is entirely within the memory 415: changing between registration states does not add or remove hardware components such as the light source 219, detectors 227, LED indicators 321, or AC power relay 433. The repeater RF node 400A-B includes a subset of the components of the plug load controller 401 and power pack 402 of FIGS. 4A-B, including the microprocessor 211, network interface(s) 213, and various programming, messages, identifiers, etc. shown in the main memory 415.

This exemplar plug load controller RF node 401 includes repeater RF node configuration programming 442 to configure the plug load controller RF node 401 to behave as a repeater RF node 400. The memory 415 includes repeater RF node configuration programming 442, RF node identifier value 450, forwarding RF node identifier 455, help request count 460, RF node hop distance value 465, heartbeat message 475 and timer 476, help request messages 480 and timer 481, help acknowledged messages 485 and timer 486, active utilization messages 490 and timer 491, and registration messages 495.

Plug load controller 401 is a retrofit device that plugs into existing AC wall outlets, for example, and allows existing wired lighting devices, such as table lamps or floor lamps that plug into a wall outlet, to operate in the lighting control system. The plug load controller 401 instantiates the table lamp or floor lamp by allowing for commissioning and maintenance operations and processes wireless lighting controls in order to the allow the lighting device to operate in the lighting system 20. As shown, plug load controller 401 includes a DC conversion circuit 431 (which may instead be a power supply) driven by a power source 205, in our example, an AC line or mains. Power source 205, however, may be a battery, solar panel, or any other AC or DC source.

DC conversion circuit 431 receives power from the power source 205, and may include a magnetic transformer, electronic transformer, switching converter, rectifier, or any other similar type of circuit to convert an input power signal into a suitable power signal to power itself. Plug load controller 401 further comprises an AC power relay 433, which relays incoming AC power from power source 205 to other devices that may plug into the receptacle of plug load controller 400A thus providing an AC power outlet 435.

Plug load controller 400A further includes a driver circuit 217 to drive the external light source 219 of the table or floor lamp, for example. The LED indicator 321 indicates the state of the plug load controller 400A, for example, during commissioning and maintenance procedures.

Figure 4B:
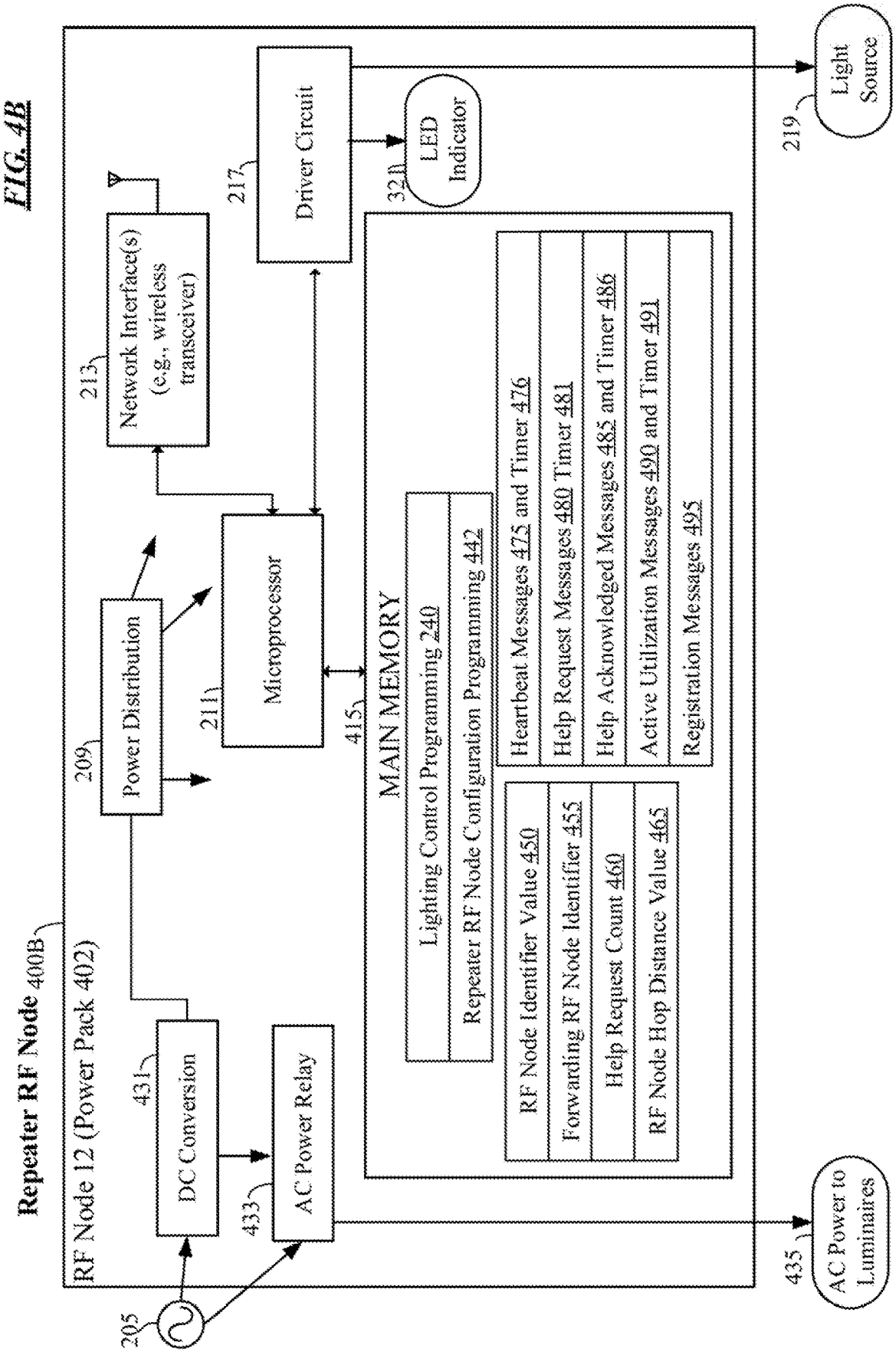
FIG. 4B illustrates a functional block diagram of a lighting system power pack RF node configured to act as a repeater RF node.

FIG. 4B is a block diagram of a power pack 402 that communicates via the extended star wireless network 25 of FIG. 1 and is configured as a second repeater RF node 400B. The circuitry, hardware, and software of plug load controller 402 shown is similar to the luminaire 200 of FIG. 2 and plug load controller 401 of FIG. 4A. Hence, main memory 415 is shown as including the lighting control programming 240, repeater RF node configuration programming 442, RF node identifier value 450, forwarding RF node identifier 455, help request count 460, RF node hop distance value 465, heartbeat message 475 and timer 476, help request messages 480 and timer 481, help acknowledged messages 485 and timer 486, active utilization messages 490 and timer 491, and registration messages 495.

Power pack 402 is a device that retrofits with existing wired light fixtures (luminaires). The power pack 402 instantiates the wired light fixture by allowing for commissioning and maintenance operations and processes wireless lighting controls in order to allow the lighting device to operate in the lighting system 20.

This exemplar power pack RF node 402 includes repeater RF node configuration programming 442 to configure the power pack RF node 402 to behave as a repeater RF node 400B. The memory 415 includes the repeater RF node configuration programming 442, RF node identifier value 450, forwarding RF node identifier 455, help request count 460, RF node hop distance value 465, heartbeat message 475 and timer 476, help request messages 480 and timer 481, help acknowledged messages 485 and timer 486, active utilization messages 490 and timer 491, and registration messages 495. However, as shown, plug load controller 401 and power pack 402 can include a subset of the circuitry, hardware, and software shown for the luminaire 201 of FIG. 2.

Main memory 415 is shown as including the lighting control programming 240, repeater RF node configuration programming 442, RF node identifier 450 of the repeater RF node 400, a forwarding RF node identifier 455, a help request count 460, an RF node hop distance value 465, heartbeat messages 475, a heartbeat timer 476, help request messages 480, a help request message timer 481, help acknowledgement messages 485, and a help acknowledgement message timer 486.

The main memory 415 includes, in addition to the elements similar to the connected RF node 300, registration messages (e.g., RF node registration messages and RF node registration acknowledgement messages 490).

Execution of the repeater RF node configuration programming 442 by the processor 211 configures the repeater RF node 400A to perform the functions required to establish the extended star wireless network 25 that the repeater RF node 400A is responsible for, such as to help non-connected 200, connected 300, and other repeater RF nodes 400B either connect to the extended star wireless network 25, or decrease the distance that respective node 200, 300, 400 is from the gateway RF node 9. First, the repeater RF node 400A stores the repeater RF node identifier 450 of a another repeater RF node 400B with a lower repeater hop distance value 465 to which the repeater RF node 400A can directly transmit a message, or the gateway RF node identifier 550 of the gateway RF node 9 to which the repeater RF node 400 can directly transmit a message, as a repeater forwarding RF node identifier 450. Second, the repeater RF node 400A stores a repeater help request count 460 as the number of non-connected RF nodes 200, connected RF nodes 300, and repeater RF nodes 400 negotiating with the repeater RF node 400. Third, the repeater RF node 400A transmits a repeater active utilization message to the repeater forwarding node identifier 450. Fourth, in response to receiving a non-connected, connected, or repeater help request message, via the extended star wireless network 25, that a respective non-connected RF node 200, connected RF node 300, or repeater RF node 400B transmits, the repeater RF node 400A increments the repeater help request count 460, and transmitting a repeater help acknowledgement message to the respective non-connected RF node 200, connected RF node 300, or the other repeater RF node 400B that includes the repeater RF node identifier 450, and the repeater help request count 460. Fifth, in response to receiving a registration message, via the extended star wireless network 25, that the respective non-connected RF node 200, connected RF node 300, or other repeater RF node 400B transmits, the repeater RF node 400A transmits the registration message to the repeater forwarding RF node identifier 450. Sixth, after waiting a first period of time, in response to not receiving the gateway heartbeat message or a respective repeater RF node heartbeat message, the repeater RF node 400A configures the repeater RF node 40A0 to act as a non-connected RF node 200. Alternatively, after waiting a second period of time, in response to not receiving a respective active utilization message, the repeater RF node 400A configures the repeater RF node 400A to act as a connected RF node 300.

The repeater RF node configuration programming 442 may further configure the repeater RF node 400A to perform the functions required to reduce the repeater RF node's 400 distance to the gateway RF node 9. First, the repeater RF node 400A stores a repeater RF node hop distance value 465. Second, the repeater RF node 400A receives a respective gateway or repeater heartbeat message, via the extended star wireless network 25, that the gateway RF node 9 or a respective repeater RF node 400 transmits. Third, in response to receiving the respective gateway or repeater heartbeat message, the repeater RF node 400A stores in the repeater RF node memory 415 a potential repeater flood network connector record for the respective heartbeat message that includes the gateway RF node identifier 550 or repeater RF node identifier 450 included in the respective gateway or repeater heartbeat message as a repeater heartbeat identifier, and the gateway or repeater RF node hop distance value 465 included in the respective heartbeat message as a repeater heartbeat distance value. Fourth, after storing the respective potential repeater flood network connector record, the repeater RF node 400A waits a third period of time, then selects as the potential repeater flood network connector, the gateway RF node 9 or the other repeater RF node 400B with the potential repeater flood network connector record having a lowest repeater heartbeat distance value 465. Finally, fifth, in response to selecting the potential repeater flood network connector record, the repeater RF node 400A transmits a repeater registration message to the gateway RF node identifier 550 or repeater RF node identifier 450 of the potential repeater flood network connector.

The repeater RF node configuration programming 442 may additionally configure the repeater RF node 400A to perform the functions required to move the repeater RF node 402 from another repeater RF node 400B with low utilization by other RF nodes 300, 400 to a third repeater RF node 400C with higher utilization by other RF nodes 300, 400. First, the repeater RF node 400A transmits, via the extended star wireless network 25, a repeater help request message to the RF nodes 200, 300. Second, after transmitting the repeater help request message, receiving, via the extended star wireless network 25, a help acknowledgement message from a sender RF node. The sender RF node can include a connected RF node 300A or a repeater RF node 400B. The respective help acknowledgement message includes a respective connected RF node identifier 350 or repeater RF node identifier 450 of the respective sender connected RF node 300A-B or repeater RF node 400B, and a respective connected 360 or repeater help request count 460. Third, in response to receiving the respective help acknowledgement message from the respective sender node, the repeater RF node 400A stores in the repeater RF node memory 415 a respective potential repeater RF node record for the respective sender RF node record that includes the respective connected 350 or repeater RF node identifier 450, and the respective connected 360 or repeater help request count 260C. Fourth, after storing the respective potential repeater RF node record, the repeater RF node 400A waits a fourth period of time, then selects as the potential repeater RF node, the respective connected RF node 300A-B or repeater RF node 400B with the respective potential repeater RF node record having a highest connected 360 or repeater help request count 460. Finally, fifth, in response to selecting the potential repeater RF node, repeater RF node 400A transmits a registration message to the respective connected 350 or repeater RF node identifier 450 of the potential repeater RF node.

The repeater RF node configuration programming 442 may yet further configure the repeater RF node 400A to modify how the repeater RF node 400A sends active utilization messages. After storing the repeater RF node hop distance value 465 representing an indirect connection to the gateway RF node 9, the repeater RF node 400A transmits an active connected utilization message to the forwarding node identifier 455.

The repeater RF node configuration programming 442 may also configure the repeater RF node 400A to forward heartbeat messages sent by the gateway RF node 9 or other repeater RF nodes 400. First, the repeater RF node 400A receives, via the extended star wireless network a gateway heartbeat message that the gateway RF node 9 transmits, or a respective repeater RF node heartbeat message that a respective repeater RF node 400 of the repeater RF nodes 400 transmits. Second, in response to receiving the gateway heartbeat message that the gateway RF node 9 transmits or the respective repeater RF node heartbeat message that the respective repeater RF node 400 transmits, the repeater RF node 400A transmits, via the extended star wireless network 25, an outgoing repeater RF node heartbeat message that includes the repeater RF node identifier 250C, and the repeater RF node hop distance value 460.

The repeater RF node configuration programming 442 may further configure the repeater RF node 400A to perform the functions required to forward a registration message, as well as a registration acknowledgement message. First, in response to receiving a respective non-connected, connected or repeater registration message, via the extended star wireless network 25, the repeater RF node 400A transmits a forwarded repeater registration message to the forwarding node identifier 450, including the contents of the respective non-connected, connected, or repeater registration message, and the repeater RF node identifier 450. Second, in response to receiving a gateway or repeater registration acknowledgement message, via the extended star wireless network 25, that the gateway RF node 9 or a respective repeater RF node 400A transmits, the repeater RF node 400A transmits a registration acknowledgement message to the respective non-connected 200, connected 300, or another repeater RF node 400B that transmitted the respective registration message to the repeater RF node 400A, via the extended star wireless network 25.

The repeater RF node configuration programming 442 may additionally configure the repeater RF node 400A to perform the functions required to store routing records within the repeater RF node 400A. First, in response to receiving a respective non-connected, connected, or repeater registration message, via the extended star wireless network 25, the repeater RF node 400A stores in the repeater RF node memory 415 a respective routing record for the respective RF node 200, 300, 400 that originated the registration message that includes the respective non-connected 250, the respective connected 350, or the respective repeater RF node identifier 450 of the respective non-connected RF node 200, connected RF node 300, or repeater RF node 400A, as the primary RF node identifier, and the repeater RF node identifiers 450 of other repeater RF nodes 400B-C that transmitted the respective registration message as repeater RF node identifiers 450. Second, in response to receiving a registration acknowledgement message, via the extended star wireless network 25, that the gateway RF node 9 or a respective repeater RF node 400A transmits, the repeater RF node 400A transmits a registration acknowledgement message to the RF node 200, 300, 400 that transmitted the registration message to the repeater RF node 400, via the extended star wireless network 25.

The repeater RF node configuration programming 442 may yet further configure the repeater RF node 400A to perform the functions required to update the routing records stored within the repeater RF node 400. In response to storing in the repeater RF node memory 415 a first repeater routing record, first, the repeater RF node 400A selects the first repeater routing record as a new repeater record. Second, the repeater RF node 400A selects a second repeater routing record stored in the repeater memory 415 that includes the same primary RF node identifier as the primary RF node identifier included in the new record, as an original repeater record. Third, the repeater RF node 400A selects any repeater routing record stored in the repeater RF node memory that includes among its repeater RF node identifiers the same RF node identifier as the primary RF node identifier included in the new record, as outdated repeater records. Fourth, the repeater RF node 400A removes from every outdated repeater record every RF node identifier included in the original repeater record. Fifth, the repeater RF node 400A adds to every outdated repeater records' repeater RF node identifiers, every RF node identifier included in the new repeater record. Finally, sixth, the repeater RF node 400A removes the outdated repeater records from the repeater RF node memory 415.

FIG. 5 is a functional block diagram of the gateway RF node 9, by way of just one example of a computing device platform that may perform the functions of the gateway RF node 9. Although the gateway 9 implements the gateway RF node 9 in the example any of the other RF nodes 1-8 and 10-12 can implement the gateway RF node 9. For example, the gateway RF node 9 can be an integrated luminaire (or a standalone touchscreen device). If the gateway RF node 9 is a luminaire, then gateway RF node 9 is line powered and remains operational as long as power is available. Alternatively, if gateway RF node 9 is a touch screen type device, gateway RF node 9 may be battery powered.

Gateway RF node 9 will generally be described as an implementation of a server or host type computer, e.g. as might be configured as a blade device in a server farm or in network room of a particular premises. Gateway RF node 9 may comprise a mainframe or other type of host computer system. As shown, gateway RF node 9 includes a wireless network interface 513 to and from the extended star wireless network 25 on-premises to RF nodes 1-8 and 10-12 installed in the physical space 21. Gateway RF node 9 also includes another network communication interface 519 for off-premises network communications over the WAN 55.

The gateway RF node 9 in the example includes a central processing unit (CPU) 511 formed of one or more processors, and a main memory 515. The circuitry forming the CPU 511 may contain a single microprocessor, or may contain a number of microprocessors for configuring the computer system as a multi-processor system, or may use a higher speed processing architecture. The main memory 515 in the example includes ROM, RAM and cache memory; although other memory devices may be added or substituted.

The gateway RF node 9 also includes one or more input/output interfaces for communications, shown by way of example as interface 519 for data communications via the WAN 55 as well as a WiFi or Bluetooth type wireless transceiver 513 for communications over the extended star wireless network 25. Network communication interface 519 may be a high-speed modem, an Ethernet (optical, cable or wireless) card or any other appropriate data communications device. The physical communication link(s) to/from the network communication interface 519 may be optical, wired, or wireless (e.g., via satellite or cellular network). Although other transceiver arrangements may be used, the example gateway RF node 9 utilizes a Wi-Fi or Bluetooth type wireless transceiver 513 similar to the other RF nodes 1-8 and 10-12 for communication over the extended star wireless network 25. The wireless transceiver 513 enables the gateway RF node 9 to communicate over-the-air with the Wi-Fi type wireless transceivers 213 of RF nodes 1-8 and 10-12 of the lighting system 20 via the extended star wireless network 25.

Although not shown, the computer platform configured as the gateway RF node 9 may further include appropriate input/output ports for interconnection with a local display and a keyboard and mouse or with a touchscreen or the like, serving as a local user interface for configuration, programming or trouble-shooting purposes. Alternatively, the operations personnel may interact with the computer system of the gateway RF node 9 for control and programming of the system from remote terminal devices via the Internet or some other link via WAN 55.

The gateway RF node 9 runs a variety of applications programs and stores various information in a database or the like for control of the fixtures, wall controllers, and any other elements of the lighting system 20 and possibly elements of an overall building managements system (BMS) at the premises. One or more such applications, for example, might enable asset tracking, lighting control through the gateway 9 and/or lighting control based on input from the sensors or wall controllers.

In the example of FIG. 5, the gateway RF node 9 includes a wireless transceiver 513 configured for data communication over an extended star wireless network 25 that includes a plurality of radio frequency (RF) nodes 1-8 and 10-12. Gateway RF node 9 includes a processor 511 coupled to the wireless transceiver 513 and a memory 515 accessible to the processor 511. The gateway RF node 9 includes gateway RF node configuration programming 548 in the memory, as well as a gateway RF node identifier 550 of the gateway RF node 9 itself.

Execution of the gateway RF node configuration programming 542 by the processor 511 configures the gateway RF node 9 to perform the functions required to establish the extended star wireless network 25 that the gateway RF node 9 is responsible for, such as heartbeat message sending, and RF node registration. First, the gateway RF node 9 transmits, via the extended star wireless network 25, the gateway heartbeat message that includes the gateway RF node identifier 550. Second, in response to receiving a respective gateway registration message, the gateway RF node 9 stores in the gateway memory 515 a gateway routing record for the respective non-connected RF node 200, connected RF node 300, or repeater RF node 400 that originated the registration message. The gateway routing record can include: the respective non-connected 250, a respective connected 350, or a respective repeater RF node identifier 450 of the respective non-connected RF node 200, connected RF node 300, or repeater RF node 400, as the primary RF node identifier, and the repeater RF node identifiers 450 of other repeater RF nodes 400 that transmitted the respective registration message as repeater RF node identifiers. Third, in response to recording the routing record, the gateway RF node 9 transmits a respective registration acknowledgement message to the respective non-connected RF node 200, connected RF node 300, or repeater RF node 400 that transmitted the registration message to the gateway RF node 9.

The gateway RF node configuration programming 542 may further configure the gateway RF node 9 to perform the functions required to update the routing records stored within the gateway RF node 9. In response to storing in the gateway RF node memory 515 a first gateway routing record, the gateway RF node 9 may first select the first gateway routing record as a new gateway record. Then, the gateway RF node 9 selects a second gateway routing record stored in the gateway memory 515 that includes the same primary RF node identifier as the primary RF node identifier included in the new record, as an original gateway record. Further, the gateway RF node 9 selects any gateway routing record stored in the gateway RF node memory that includes among its repeater RF node identifiers the same RF node identifier as the primary RF node identifier included in the new record, as outdated gateway records. Additionally, the gateway RF node 9 removes from every outdated gateway record every RF node identifier included in the original gateway record. Then, the gateway RF node 9 adds to every outdated gateway records' repeater RF node identifiers, every RF node identifier included in the new gateway record. Finally, the gateway RF node 9 removes the outdated gateway records from the gateway RF node memory 515.

The example of FIG. 5 shows a single instance of gateway RF node 9. Of course, the gateway functions may be implemented in a distributed fashion on a number of similar platforms, to distribute the processing load. Additional networked systems (not shown) may be provided to distribute the processing and associated communications, e.g. for load balancing or failover.

The hardware elements, operating systems and programming languages of computer systems like that of the gateway RF node 9 generally are conventional in nature, and it is presumed that those skilled in the art are sufficiently familiar therewith to understand implementation of the present system and associated lighting control technique using suitable configuration and/or programming of such computer system(s).

FIG. 6 is a ping pong diagram of a non-connected RF node 200, 601A connecting to the extended star wireless network 25 by heartbeat message. In operation 625, the non-connected RF node 601A powers on and begins listening for a heartbeat message from a heartbeat RF node 602: either the gateway RF node 2009 or a repeater RF node 400 can fulfill the role of a heartbeat RF node 602.

Next, in operation 630 the heartbeat RF node 402 sends a heartbeat message to the non-connected RF node 601A, which includes identifying information for the heartbeat RF node 602, as well as any routing information to the gateway RF node 9 if the heartbeat RF node 602 is a repeater RF node 200C. This heartbeat message is not a message sent deliberately to this specific non-connected RF node 601A: the message is sent by multicast, and may be received by this non-connected RF node 601A, or any non-connected RF node 200 capable of receiving the heartbeat message. Following this, the non-connected RF node 601A, having received a heartbeat message, sends a registration message to the gateway RF node 9, using the routing information found in the heartbeat message. The registration message includes identifying information for the non-connected RF node 601A, as well as any routing information. The gateway RF node 9 receives this information, and creates a routing record containing the routing path between the gateway RF node 9 and the non-connected RF node 601A in operation 635.

After receiving this registration message to start operation 640, the gateway RF node 9 sends back a registration acknowledgement message to the non-connected RF node 601A, via the routing information, through the extended star wireless network 25. If any repeater RF nodes 400 are required to forward this message to the non-connected RF node 601A, those repeater RF nodes 400 make a copy of the routing information stored within the registration acknowledgement message. Finally, in step 645, once the non-connected RF node 601A receives this registration acknowledgement message, it configures itself to act as a connected RF node 601B.

FIG. 7 is a ping pong diagram of a non-connected RF node 200, 401A connecting to the extended star wireless network 25 by help request message. In block 725 the non-connected RF node 701A does not receive a heartbeat message, and therefore sends a help request message to the extended star wireless network 25, specifically the connected RF nodes 400.

Next, in block 730 a connected RF node 702B receives this help request message. The connected RF node 702B has a running count of every RF node currently requesting help from itself, and responds to the help request with a help acknowledgement message, containing the identifying information of the connected RF node 702B, as well as this running count of current help requests. Following this, the non-connected RF node 701A, upon receiving a first help acknowledgement message, starts a countdown timer 286A. At the end of the timer period, the non-connected RF node 701A examines all of the help acknowledgement messages 285A it has received since the timer 286A started. The non-connected RF node 701A then sends a registration message to the connected RF node 702B that sent the highest running count of help requests from among all of the help acknowledgement message the non-connected RF node 701A received as block 735.

Block 740 involves the connected RF node 702B, having received a registration message from the non-connected RF node 701A, configuring itself to act as a repeater RF node 400. The new repeater RF node 702C then forwards the registration message to the gateway RF node 9. The gateway RF node 9 receives this information, and creates a routing record, containing the routing path between the gateway RF node 9 and the non-connected RF node 701A.

Next, for block 745, the gateway RF node 9 sends back a registration acknowledgement message to the non-connected RF node 701A, via the routing information, through the extended star wireless network 25. The repeater RF node 702C, and any other repeater RF nodes 400 that are required to forward this message to the non-connected RF node 701A, make a copy of the routing information stored within the registration acknowledgement message. Finally, in block 750, the new repeater RF node 702C forwards the registration acknowledgement message to the non-connected RF node 701A. Once the non-connected RF node 701A receives this registration acknowledgement message, it configures itself to act as a connected RF node 701B.

FIG. 8 is a ping pong diagram of a connected 300 or repeater RF node 400 performing a periodic check to see if it can move to a more popular node 300-C. Any node performing this check can be called a help requesting RF Node 801. In block 825 the help requesting RF node 801 does this by sending help request messages to every connected 300 or repeater RF node 400 it can directly contact. One of these node can be called a Help Acknowledging RF node 802.

In block 830, a help acknowledging RF node 802 receives the help request message. The help acknowledging RF node 802 has a running count of every RF node 200-C currently requesting help from itself, and responds to the help request with a help acknowledgement message, containing the identifying information of the help acknowledging RF node 802, as well as this running count of current help requests.

The help requesting RF node 801, upon receiving a first help acknowledgement message, starts a countdown timer 286B-C for block 835. At the end of the timer period, the help requesting RF node 801 examines all of the help acknowledgement message it has received since the timer 286B-C started. The help requesting RF node 801 then sends a registration message to the help acknowledging RF node 802 that sent the highest running count of help requests from among all of the help acknowledgement message the help requesting RF node 801 received.

For block 840, the help acknowledging RF node 802, having received a registration message from the help requesting RF node 801, configures itself to act as a repeater RF node 400 if it currently a connected RF node 300. The help acknowledging RF node then forwards the registration message to the gateway RF node 9. The gateway RF node 9 receives this information, and updates its routing record to contain the new routing path between the gateway RF node 9 and the help requesting RF node 801.

The gateway RF node 9 sends back a registration acknowledgement message to the help requesting RF node 801, via the routing information, through the extended star wireless network 25 in block 845. The help acknowledging RF node 802, and any other repeater RF nodes 400 that are required to forward this message to the help requesting RF node 801, make a copy of the routing information stored within the registration acknowledgement message. Finally, in block 850, the help acknowledging RF node 802 forwards the registration acknowledgement message to the help requesting RF node 801.

FIG. 9 is a ping pong diagram of a connected 300 or repeater RF node 400 performing a periodic check to see if it can move to the gateway RF node 9, or to a repeater RF node 400 closer to the gateway RF node 9. Any node performing this check can be called a Network Connecting RF Node 901. In block 925 the network connecting RF node 901 does this by collecting heartbeat messages from the gateway RF node 9 and every repeater RF node 400 that forward a heartbeat message. One of these heartbeat-sending nodes can be called a network connector RF node 902.

In block 930, a repeater RF node 400 has a value stored counting every other repeater RF node 400 required to forward messages from the repeater RF node 400 to the gateway RF node 9. The heartbeat messages network connector RF node 902 sends out contain identifying information as well as the count of other repeater RF nodes 400 required if they are a repeater RF node 400; or, if the network connector RF node 902 is the gateway RF node 9, it only sends out its own identifier, signaling that it has a distance from the gateway RF node of zero.

The network connecting RF node 901, upon receiving a first heartbeat message, starts a countdown timer 276B-C for block 935. At the end of the timer period, the network connecting RF node 901 examines all of the heartbeat messages 275B-C it has received since the timer 276B-C started. The network connecting RF node 901 then sends a registration message to the network connector RF node 902 that sent the smallest distance from the gateway RF node value, from among all of the heartbeat messages 276B-C the network connecting RF node 901 received.

For block 940, The network connector RF node 902, having received a registration message from the network connecting RF node 901, forwards the registration message to the gateway RF node 9 if it is not itself the gateway RF node 9. The gateway RF node 9 receives this information, and updates its routing record to contain the new routing path between the gateway RF node 9 and the network connecting RF node 901.

The gateway RF node 9 sends back a registration acknowledgement message to the network connecting RF node 901, via the routing information, through the extended star wireless network 25 in block 945. Any repeater RF nodes 400 that are required to forward this message to the network connecting RF node 901, make a copy of the routing information stored within the registration acknowledgement message. Finally in block 950, the network connector RF node 902, if it is not the gateway RF node 9, forwards the registration acknowledgement message to the network connecting RF node 901.

FIG. 10 is a ping pong diagram of lost heartbeat signal. A connected 300 or repeater RF node 400 is listening for a heartbeat message from either a repeater RF node 400, or the gateway RF node 9. Any node listening can be called a heartbeat listener RF node 1001B, and the gateway RF node 9 or repeater RF node 400 to which the heartbeat listener RF node 1001B is directly connected to can be called a heartbeat RF node 1002 in operation 1025.

In operation 1030, while the heartbeat listener RF node 1001B is periodically receiving heartbeat messages from the heartbeat RF node 1002, it 1001B knows it is connected to the extended star wireless network 25, and therefore needs to take no action. However, once the heartbeat listener RF node 1001B does not receive a heartbeat message for a period of time from the heartbeat RF node 1002, it 1001B knows it is no longer connected to the extended star wireless network 25, and therefore configures itself 1001B to act as a non-connected RF node 1001A in block 835.

FIG. 11 is a ping pong diagram of a lost active utilization signal. A repeater RF node 1101C is listening for an active utilization message from either a repeater RF node 400 or connected RF node 300 that uses the repeater RF node 1101C to connect to the rest of the extended star wireless network 25 in operation 1125. Any node that uses the repeater RF node 1101C to connect to the rest of the extended star wireless network 25 can be called an active utilization RF node 1102.

In operation 1130, while the repeater RF node 1101C is periodically receiving active utilization messages from an active utilization RF node 1102, it knows it is needed by the active utilization RF node 1102 to remain connected to the extended star wireless network 25, and therefore the repeater RF node 1101C needs to take no action. However, once the repeater RF node 1101C does not receive an active utilization message for a period of time from any active utilization RF node 1102, it knows it is no longer needed by any active utilization RF node 1102 to remain connected to the extended star wireless network 25, and therefore configures itself to act as an connected RF node 1101B in operation 1135.

Figure 12:
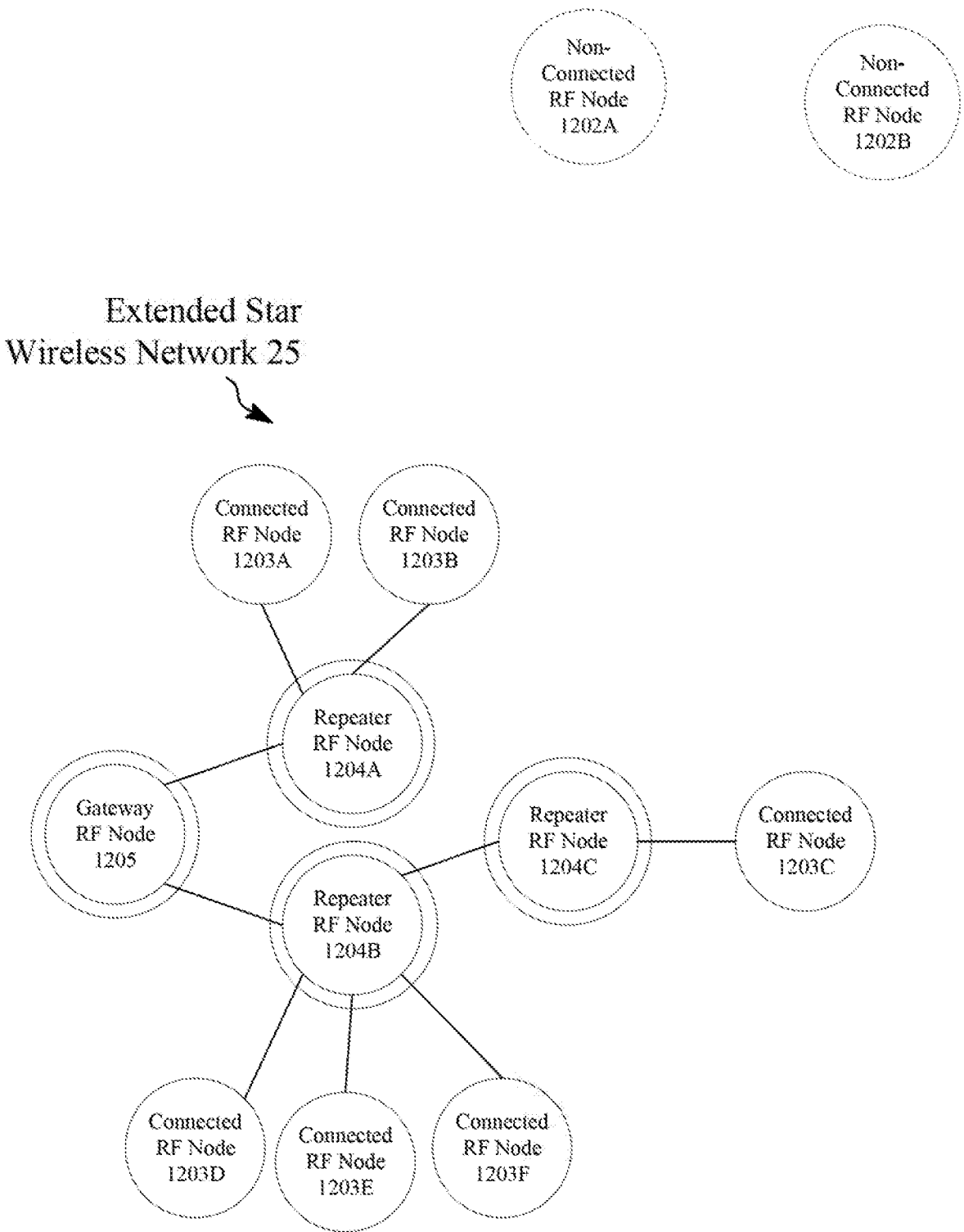
FIG. 12 is a schematic of an example extended star wireless RF node network.

FIG. 12 is a schematic of an example extended star wireless network 1200, specifically illustrating the RF node roles, and the connections between nodes. Extended star wireless network 1200 includes a gateway RF node 1205, repeater RF nodes 1204A-C, connected RF nodes 1203A-F, and non-connected RF nodes 1202A-B. First, the gateway 1205, repeater 1204, connected, 1203, and non-connected RF nodes can be embodied in any kind of lighting system 20 structure. Meaning, any of these nodes could be a luminaire 200, wall switch 300A, touch screen device 300B, plug load controller 400A, power pack 400B, or any other type of RF node configured to connect to the extended star wireless network 25 and fill the role of non-connected RF node 200, connected RF node 300, or repeater RF node 400.

In this example, there are twelve nodes. There is a gateway RF node 1205 configured as an RF gateway node 500, which has two RF nodes 1204A, 1204B within its radio range. These two nodes 1204A, 1204B are connected to the gateway RF node 1205. Therefore, these two nodes 1204A, 1204B are initially configured as connected nodes 300.

Next, there are six other RF nodes 1203A, 1203B, 1204C, 1203D, 1203E, 1203F that are set as non-connected RF nodes 200, within the range of the two first nodes 1204A, 1204B, but that are not within range of gateway RF node 1205. Therefore, these six nodes 1203A, 1203B, 1203D, 1203E, 1203F, 1204C request that the two connected nodes 1204A, 1204B configure themselves as repeater RF nodes 400, and connect the six RF nodes 1203A, 1203B, 1203D, 1203E, 1203F, 1204C to the gateway RF node 1205. All six RF nodes 1203A, 1203B, 1203D, 1203E, 1203F, 1204C are then set as connected RF nodes 300, with the two RF nodes 1203A, 1203B connecting to the newly configured repeater 1204A, and the remaining four nodes 1203D, 1203E, 1203F 1204C connecting to the newly configured second repeater node 1204B. RF node 1204C is close enough to both repeater nodes 1204A, 1204B to connect to either repeater RF node 1204A, 1204B, but selects the second repeater RF node 1204B, as it has more potential connections than repeater node 1204A (four potential connections compared to three potential connections.) Repeater RF node 1204A is not a potential connector to 1204B, and repeater RF node 1204B is not a potential connector to 1204A, because either node connecting to the other would increase that connecting RF node's distance from the gateway RF node 1205.

Further, there is an RF node 1203C that is within the range of connected RF node 1204C, but not within range of repeater nodes 1204A, 1204B, or gateway RF node 1205. This node 1203C requests that the node 1204C itself as a repeater RF node 400, and connect the node 1203C to the gateway RF node 1205. Connected RF node 1204C then configures itself to be the third repeater RF node 1204C, and connects the new connected RF node 1203C to the gateway RF node 1205 via the third repeater RF node's 1204C forwarding RF node 1204B.

Additionally, there are two RF nodes 1202A, 1202B that are within range of each other, but no other nodes, including the gateway RF node 1205. These nodes are unable to request a connection from any other connected 300, repeater 400, or gateway RF node 500, will receive no help acknowledgement messages, or heartbeat messages. Consequently, these two nodes 1202A, 1202B will remain non-connected RF nodes 200, unconnected to the extended star network 25.

Finally, after all possible connections are made and optimized, the extended star wireless network 25 is as depicted: a single gateway RF node 1205, connected to a repeater RF node 1204A, which forwards for connected RF nodes 1203A, 1203B. A second repeater RF node 1204B is also connected to the gateway RF node 1205, and forwards for connected RF nodes 1203D, 1203E, 1203F, as well as repeater RF node 1204C. This third repeater RF node 1204C forwards for another connected RF node 1203C. Last, the two non-connected RF nodes 1202A, 1202B are unconnected to the gateway RF node 1205, both by direct connection as well as forwarded connection, and are therefore not connected to the extended star wireless network 25, though they may be part of the lighting system 20, and may also exist in the same physical space 21 as the other RF nodes 1202, 1203, 1205.

Any of the steps or functionality of the node configuration programming 242, 244, and 246 described herein for the RF nodes (e.g., luminaires 1-8, gateway 9, lighting control device 10, plug load controller 11, and power pack 12) of the lighting system 20 can be embodied in programming or one more applications as described previously. According to some embodiments, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims. It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A radio frequency (RF) communication system comprising: a plurality of RF nodes including a gateway RF node, non-connected RF nodes, connected RF nodes, and repeater RF nodes, wherein each of the non-connected RF nodes includes:
a non-connected RF node wireless transceiver configured for data communication over an extended star wireless network that includes the plurality of RF nodes;
a non-connected RF node processor coupled to the non-connected RF node wireless transceiver;
a non-connected RF node memory accessible to the non-connected RF node processor including a non-connected RF node identifier identifying the non-connected RF node; and
non-connected RF node programming in the non-connected RF node memory, wherein execution of the non-connected node programming by the non-connected RF node processor configures the non-connected RF node to implement functions, including functions to:
after being powered on by a power source, receive, via the extended star wireless network:
a gateway heartbeat message from the gateway RF node, or
a respective repeater RF node heartbeat message from a respective repeater RF node of the repeater RF nodes;
in response to receiving:
the gateway heartbeat message from the gateway RF node, transmit, via the extended star wireless network, a first registration message to the gateway RF node, or
the respective repeater RF node heartbeat message from the respective repeater RF node, transmit, via the extended star wireless network, the first registration message to the respective repeater RF node; and
in response to receiving:
a gateway acknowledgement message, via the extended star wireless network, from the gateway RF node, configure the non-connected RF node to act as one of the connected RF nodes, or
a repeater registration acknowledgement message, via the extended star wireless network, from the respective repeater RF node, configure the non-connected RF node to act as one of the connected RF nodes; or
after waiting a first period of time, in response to not receiving the gateway heartbeat message or the respective repeater RF node heartbeat message:
transmit, via the extended star wireless network, a non-connected help request message to the connected RF nodes;
after transmitting the non-connected help request message, receive, via the extended star wireless network, a respective connected help acknowledgement message from a respective connected RF node of the connected RF nodes, the respective connected help acknowledgement message including:
(i) a respective connected RF node identifier of the respective connected RF node, and
(ii) a respective connected help request count of the respective connected RF node;
in response to receiving the respective connected help acknowledgement message from the respective connected RF node, wait a second period of time, then select as a potential repeating RF node, the respective connected RF node having a highest connected help request count; and
in response to selecting the potential repeating RF node, transmit a first registration message to the respective connected RF node identifier of the potential repeating RF node.

2. A radio frequency (RF) communication system comprising: a plurality of RF nodes including a gateway RF node, non-connected RF nodes, connected RF nodes, and repeater RF nodes, wherein each of the non-connected RF nodes includes:
a non-connected RF node wireless transceiver configured for data communication over an extended star wireless network that includes the plurality of RF nodes;
a non-connected RF node processor coupled to the non-connected RF node wireless transceiver;
a non-connected RF node memory accessible to the non-connected RF node processor including a non-connected RF node identifier identifying the non-connected RF node; and
non-connected RF node programming in the non-connected RF node memory, wherein execution of the non-connected node programming by the non-connected RF node processor configures the non-connected RF node to implement functions, including functions to:
after being powered on by a power source, receive, via the extended star wireless network:
a gateway heartbeat message from the gateway RF node, or
a respective repeater RF node heartbeat message from a respective repeater RF node of the repeater RF nodes;
in response to receiving:
the gateway heartbeat message from the gateway RF node, transmit, via the extended star wireless network, a first registration message to the gateway RF node, or
the respective repeater RF node heartbeat message from the respective repeater RF node, transmit, via the extended star wireless network, the first registration message to the respective repeater RF node; and
in response to receiving:
a gateway acknowledgement message, via the extended star wireless network, from the gateway RF node, configure the non-connected RF node to act as one of the connected RF nodes, or
a repeater registration acknowledgement message, via the extended star wireless network, from the respective repeater RF node, configure the non-connected RF node to act as one of the connected RF nodes;
wherein the gateway RF node includes:
a gateway wireless transceiver configured for data communication over the extended star wireless network that includes the plurality of RF nodes;
a gateway processor coupled to the gateway wireless transceiver;
a gateway memory accessible to the gateway processor, including a gateway RF node identifier, identifying the gateway RF node; and
gateway programming in the gateway memory, wherein execution of the gateway programming by the gateway processor configures the gateway to implement functions, including functions to:
- transmit, via the extended star wireless network, the gateway heartbeat message that includes the gateway RF node identifier;
- in response to receiving a respective gateway registration message, store in the gateway memory a gateway routing record for the respective non-connected RF node, connected RF node, or repeater RF node that originated the registration message;
- in response to recording the routing record, transmit a respective registration acknowledgement message to the respective non-connected RF node, connected RF node, or repeater RF node that transmitted the registration message to the gateway RF node.

3. The RF communication system of claim 2, wherein the gateway routing record includes:
(i) the respective non-connected, a respective connected, or a respective repeater RF node identifier of the respective non-connected RF node, connected RF node, or repeater RF node, as the primary RF node identifier, and
(ii) the repeater RF node identifiers of other repeater RF nodes that transmitted the respective registration message as repeater RF node identifiers.

4. A radio frequency (RF) communication system comprising: a plurality of RF nodes including a gateway RF node, non-connected RF nodes, connected RF nodes, and repeater RF nodes, wherein each of the non-connected RF nodes includes:
a non-connected RF node wireless transceiver configured for data communication over an extended star wireless network that includes the plurality of RF nodes;
a non-connected RF node processor coupled to the non-connected RF node wireless transceiver;
a non-connected RF node memory accessible to the non-connected RF node processor including a non-connected RF node identifier identifying the non-connected RF node; and
non-connected RF node programming in the non-connected RF node memory, wherein execution of the non-connected node programming by the non-connected RF node processor configures the non-connected RF node to implement functions, including functions to:
after being powered on by a power source, receive, via the extended star wireless network:
a gateway heartbeat message from the gateway RF node, or
a respective repeater RF node heartbeat message from a respective repeater RF node of the repeater RF nodes;
in response to receiving:
the gateway heartbeat message from the gateway RF node, transmit, via the extended star wireless network, a first registration message to the gateway RF node, or
the respective repeater RF node heartbeat message from the respective repeater RF node, transmit, via the extended star wireless network, the first registration message to the respective repeater RF node; and
in response to receiving:
a gateway acknowledgement message, via the extended star wireless network, from the gateway RF node, configure the non-connected RF node to act as one of the connected RF nodes, or
a repeater registration acknowledgement message, via the extended star wireless network, from the respective repeater RF node, configure the non-connected RF node to act as one of the connected RF nodes;
wherein each of the connected RF nodes include:
a connected RF node wireless transceiver configured for data communication over the extended star wireless network that includes the plurality of RF nodes;
a connected RF node processor coupled to the connected RF node wireless transceiver;
a connected RF node memory accessible to the connected RF node processor, including a connected RF node identifier identifying the connected RF node; and
connected RF node programming in the connected RF node memory, wherein execution of the connected RF node programming by the connected RF node processor configures the connected RF node to implement functions, including functions to:
store a repeater RF node identifier of a respective repeater RF node with a lower repeater hop distance value to which the connected RF node can directly transmit a message, or a gateway RF node identifier of the gateway RF node to which the connected RF node can directly transmit a message, as a connected forwarding RF node identifier;
store a connected help request count as the number of non-connected RF nodes, connected RF nodes, and repeater RF nodes negotiating with the connected RF node;
transmit a connected active utilization message to the connected forwarding node identifier;
in response to receiving a non-connected, connected, or repeater help request message, via the extended star wireless network, that a respective non-connected RF node, connected RF node, or repeater RF node transmits, increment the connected help request count, and transmit a connected help acknowledgement message to the respective non-connected RF node, connected RF node, or repeater RF node that includes:
(i) the connected RF node identifier, and
(ii) the connected help request count;
in response to receiving a registration message, via the extended star wireless network, that the respective non-connected RF node, connected RF node, or repeater RF node transmits, transmit the registration message to the connected forwarding RF node identifier;
in response to receiving the gateway acknowledgement message or the repeater registration acknowledgement message, via the extended star wireless network, configure the connected RF node to act as a repeater RF node; and
after waiting a first period of time, in response to not receiving the gateway heartbeat message or the repeater RF node heartbeat message, configure the connected RF node to act as a non-connected RF node.

5. The RF communication system of claim 4, wherein execution of the connected RF node programming by the connected RF node processor configures the connected RF node to implement functions, including functions to:

store a connected RF node hop distance value;

receive a respective gateway or repeater heartbeat message, via the extended star wireless network, that the gateway RF node or a respective repeater RF node transmits;

in response to receiving the respective gateway or repeater heartbeat message, wait a second period of time, then select as a potential connected flood network connector, the gateway or repeater RF node having a lowest connected heartbeat distance value; and in response to selecting the potential connected flood network connector, transmit the second registration message to the gateway or repeater RF node identifier of the potential connected flood network connector.

6. The RF communication system of claim 5, wherein execution of the connected RF node programming by the connected RF node processor configures the connected RF node to implement functions, including functions to:

transmit, via the extended star wireless network, a connected help request message to the RF nodes;

after transmitting the connected help request message, receive, via the extended star wireless network, a respective connected or repeater help acknowledgement message from a respective sender connected or repeater RF node, the respective help acknowledgement message including:
(i) a respective connected or repeater RF node identifier of the respective sender connected or repeater RF node, and
(ii) a respective connected or repeater help request count;

in response to receiving the respective help acknowledgement message from the respective sender connected or repeater RF node, wait a third period of time, then select as a potential connected repeating RF node, the respective connected or repeater RF node having a highest connected or repeater help request count; and in response to selecting the potential connected repeating RF node, transmit a registration message to the respective connected or repeater RF node identifier of the potential connected repeating RF node.

7. The RF communication system of claim 6, wherein execution of the connected RF node programming by the connected RF node processor configures the connected RF node to implement functions, including functions to:

after storing the connected RF node hop distance value representing an indirect connection to the gateway RF node, transmit an active connected utilization message to the forwarding node identifier.

8. A radio frequency (RF) communication system comprising: a plurality of RF nodes including a gateway RF node, non-connected RF nodes, connected RF nodes, and repeater RF nodes, wherein each of the non-connected RF nodes includes:

a non-connected RF node wireless transceiver configured for data communication over an extended star wireless network that includes the plurality of RF nodes;

a non-connected RF node processor coupled to the non-connected RF node wireless transceiver;

a non-connected RF node memory accessible to the non-connected RF node processor including a non-connected RF node identifier identifying the non-connected RF node; and non-connected RF node programming in the non-connected RF node memory, wherein execution of the non-connected node programming by the non-connected RF node processor configures the non-connected RF node to implement functions, including functions to:

after being powered on by a power source, receive, via the extended star wireless network:
a gateway heartbeat message from the gateway RF node, or
a respective repeater RF node heartbeat message from a respective repeater RF node of the repeater RF nodes;

in response to receiving:
the gateway heartbeat message from the gateway RF node, transmit, via the extended star wireless network, a first registration message to the gateway RF node, or
the respective repeater RF node heartbeat message from the respective repeater RF node, transmit, via the extended star wireless network, the first registration message to the respective repeater RF node; and in response to receiving:
a gateway acknowledgement message, via the extended star wireless network, from the gateway RF node, configure the non-connected RF node to act as one of the connected RF nodes, or
a repeater registration acknowledgement message, via the extended star wireless network, from the respective repeater RF node, configure the non-connected RF node to act as one of the connected RF nodes;

wherein each of the repeater RF nodes include:
a repeater RF node wireless transceiver configured for data communication over the extended star wireless network that includes the plurality of RF nodes;
a repeater RF node processor coupled to the repeater RF node wireless transceiver;
a repeater RF node memory accessible to the repeater RF node processor, including a repeater RF node identifier identifying the repeater RF node; and
repeater RF node programming in the repeater RF node memory, wherein execution of the repeater RF node programming by the repeater RF node processor configures the repeater RF node to implement functions, including functions to:
store the repeater RF node identifier of a respective repeater RF node with a lower repeater hop distance value to which the repeater RF node can directly transmit a message, or the gateway RF node identifier of the gateway RF node to which the repeater RF node can directly transmit a message, as a repeater forwarding RF node identifier;
store a repeater help request count as the number of non-connected RF nodes, connected RF nodes, and repeater RF nodes negotiating with the repeater RF node;
transmit a repeater active utilization message to the repeater forwarding node identifier;
in response to receiving a non-connected, connected, or repeater help request message, via the extended star wireless network, that a respective non-connected RF node, connected RF node, or repeater RF node transmits, increment the repeater help request count, and transmit a repeater help acknowledgement message to the respective non-connected RF node, connected RF node, or repeater RF node that includes:

(i) the repeater RF node identifier, and
(ii) the repeater help request count;
in response to receiving a registration message, via the extended star wireless network, that the respective non-connected RF node, connected RF node, or repeater RF node transmits, transmit the registration message to the repeater forwarding RF node identifier;
after waiting a first period of time, in response to not receiving the gateway heartbeat message or a respective repeater RF node heartbeat message, configure the repeater RF node to act as a non-connected RF node; and
after waiting a second period of time, in response to not receiving a respective active utilization message, configure the repeater RF node to act as a connected RF node.

9. The RF communication system of claim 8, wherein execution of the repeater RF node programming by the repeater RF node processor configures the repeater RF node to implement functions, including functions to:
store a repeater RF node hop distance value;
receive a respective gateway or repeater heartbeat message, via the extended star wireless network, that the gateway RF node or a respective repeater RF node transmits;
in response to receiving the respective gateway or repeater heartbeat message, wait a third period of time, then select as the potential repeater flood network connector, the gateway or the repeater RF node having a lowest repeater heartbeat distance value; and
in response to selecting the potential repeater flood network connector, transmit a second registration message to the gateway or repeater RF node identifier of the potential repeater flood network connector.

10. The RF communication system of claim 9, wherein execution of the repeater RF node programming by the repeater RF node processor configures the repeater RF node to implement functions, including functions to:
transmit, via the extended star wireless network, a repeater help request message to the RF nodes;
after transmitting the repeater help request message, receive, via the extended star wireless network, a respective connected or repeater help acknowledgement message from a respective sender connected or repeater RF node, the respective help acknowledgement message including:
(i) a respective connected or repeater RF node identifier of the respective sender connected or repeater RF node, and
(ii) a respective connected or repeater help request count;
in response to receiving the respective help acknowledgement message from the respective sender connected or repeater RF node, wait a fourth period of time, then select as the potential repeater RF node, the respective connected or repeater RF node having a highest connected or repeater help request count; and
in response to selecting the potential repeater RF node, transmit a registration message to the respective connected or repeater RF node identifier of the potential repeater RF node.

11. The RF communication system of claim 10, wherein execution of the repeater RF node programming by the repeater RF node processor configures the repeater RF node to implement functions, including functions to:
after storing the repeater RF node hop distance value representing an indirect connection to the gateway RF node, transmit an active repeater utilization message to the forwarding node identifier.

12. The RF communication system of claim 11, wherein execution of the repeater RF node programming by the repeater RF node processor configures the repeater RF node to implement functions, including functions to:
receive, via the extended star wireless network:
a gateway heartbeat message that the gateway RF node transmits, or
a respective repeater RF node heartbeat message that a respective repeater RF node of the repeater RF nodes transmits;
in response to receiving:
the gateway heartbeat message that the gateway RF node transmits or the respective repeater RF node heartbeat message that the respective repeater RF node transmits, transmit, via the extended star wireless network, an outgoing repeater RF node heartbeat message that includes:
(i) the repeater RF node identifier, and
(ii) the repeater RF node hop distance value.

13. The RF communication system of claim 12, wherein execution of the repeater RF node programming by the repeater RF node processor configures the repeater RF node to implement functions, including functions to:
in response to receiving a respective first, second or a third registration message, via the extended star wireless network, transmit a forwarded second registration message to the forwarding node identifier, including:
(i) the contents of the respective first, second, or third registration message, and
(ii) the repeater RF node identifier,
in response to receiving a gateway or repeater registration acknowledgement message, via the extended star wireless network, that the gateway or a respective repeater RF node transmits, transmit a registration acknowledgement message to the respective non-connected, connected, or repeater RF node that transmitted the respective registration message to the repeater RF node, via the extended star wireless network.

14. The RF communication system of claim 13, wherein execution of the repeater RF node programming by the repeater RF node processor configures the repeater RF node to implement functions, including functions to:
in response to receiving a respective first, second, or third registration message, via the extended star wireless network, store in the repeater RF node memory a respective routing record for the respective RF node that originated the registration message;
in response to receiving a registration acknowledgement message, via the extended star wireless network, that the gateway or a respective repeater RF node transmits, transmit a registration acknowledgement message to the RF node that transmitted the registration message to the repeater RF node, via the extended star wireless network.

15. The RF communication system of claim 14, wherein the repeater routing record includes:
(i) the respective non-connected, the respective connected, or the respective repeater RF node identifier of the respective non-connected RF node, connected RF node, or repeater RF node, as the primary RF node identifier, and (ii) the repeater RF node identifiers of other repeater RF nodes that transmitted the respective registration message as repeater RF node identifiers.

16. A method comprising steps of:

receiving, at a non-connected radio frequency (RF) node via an extended star wireless network:
 (i) a gateway heartbeat message from a gateway RF node, or
 (ii) a respective repeater RF node heartbeat message from a respective repeater RF node of a plurality of repeater RF nodes;

in response to receiving:
 (i) the gateway heartbeat message from the gateway RF node, transmitting, via the extended star wireless network, a first registration message to the gateway RF node, or
 (ii) the respective repeater RF node heartbeat message from the respective repeater RF node, transmitting, via the extended star wireless network, the first registration message to the respective repeater RF node;

in response to receiving:
 (i) a gateway acknowledgement message from the gateway RF node, configuring the non-connected RF node to act as a respective connected RF node, or
 (ii) a repeater registration acknowledgement message from the respective repeater RF node, configuring the non-connected RF node to act as the respective connected RF node;

transmitting, via the extended star wireless network, the gateway heartbeat message that includes a gateway RF node identifier; and in response to receiving a respective gateway registration message, transmitting a respective registration acknowledgement message to a respective non-connected RF node, connected RF node, or repeater RF node that transmitted the registration message to the gateway RF node.

17. A method comprising steps of:

receiving, at a non-connected radio frequency (RF) node via an extended star wireless network:
 (i) a gateway heartbeat message from a gateway RF node, or
 (ii) a respective repeater RF node heartbeat message from a respective repeater RF node of a plurality of repeater RF nodes;

in response to receiving:
 (i) the gateway heartbeat message from the gateway RF node, transmitting, via the extended star wireless network, a first registration message to the gateway RF node, or
 (ii) the respective repeater RF node heartbeat message from the respective repeater RF node, transmitting, via the extended star wireless network, the first registration message to the respective repeater RF node;

in response to receiving:
 (i) a gateway acknowledgement message from the gateway RF node, configuring the non-connected RF node to act as a respective connected RF node, or
 (ii) a repeater registration acknowledgement message from the respective repeater RF node, configuring the non-connected RF node to act as the respective connected RF node;

storing a repeater RF node identifier, identifying a respective repeater RF node with a lower repeater hop distance value to which a connected RF node can directly transmit a message, or a gateway RF node identifier of the gateway RF node to which the respective connected RF node can directly transmit a message, as a connected forwarding RF node identifier;

storing a connected help request count as the number of non-connected RF nodes, connected RF nodes, and repeater RF nodes negotiating with the connected RF node;

transmitting a connected active utilization message to the connected forwarding node identifier;

in response to receiving a non-connected, connected, or repeater help request message, via the extended star wireless network, that a respective non-connected RF node, connected RF node, or repeater RF node transmits, incrementing the connected help request count, and transmitting a connected help acknowledgement message to the respective non-connected RF node, connected RF node, or repeater RF node that includes:
 (i) the connected RF node identifier, and
 (ii) the connected help request count;

in response to receiving a registration message, via the extended star wireless network, that the respective non-connected RF node, connected RF node, or repeater RF node transmits, transmitting the registration message to the connected forwarding RF node identifier;

in response to receiving the gateway acknowledgement message or the repeater registration acknowledgement message, via the extended star wireless network, configuring the connected RF node to act as a repeater RF node; and after waiting a first period of time, in response to not receiving the gateway heartbeat message or the repeater RF node heartbeat message, configuring the connected RF node to act as a non-connected RF node.

18. A method comprising steps of:

receiving, at a non-connected radio frequency (RF) node via an extended star wireless network:
 (i) a gateway heartbeat message from a gateway RF node, or
 (ii) a respective repeater RF node heartbeat message from a respective repeater RF node of a plurality of repeater RF nodes;

in response to receiving:
 (i) the gateway heartbeat message from the gateway RF node, transmitting, via the extended star wireless network, a an first registration message to the gateway RF node, or
 (ii) the respective repeater RF node heartbeat message from the respective repeater RF node, transmitting, via the extended star wireless network, the first registration message to the respective repeater RF node;

in response to receiving:
 (i) a gateway acknowledgement message from the gateway RF node, configuring the non-connected RF node to act as a respective connected RF node, or
 (ii) in response to receiving a repeater registration acknowledgement message from the respective repeater RF node, configuring the non-connected RF node to act as the respective connected RF node;

storing the repeater RF node identifier, identifying a respective repeater RF node with a lower repeater hop distance value to which a repeater RF node can directly transmit a message, or a gateway RF node identifier of the gateway RF node to which the repeater RF node can directly transmit a message, as a repeater forwarding RF node identifier;

storing a repeater help request count as the number of non-connected RF nodes, connected RF nodes, and repeater RF nodes negotiating with the repeater RF node;

transmitting a repeater active utilization message to the repeater forwarding node identifier;

in response to receiving a non-connected, connected, or repeater help request message, via the extended star wireless network, that a respective non-connected RF node, connected RF node, or repeater RF node transmits, incrementing the repeater help request count, and transmitting a repeater help acknowledgement message to the respective non-connected RF node, connected RF node, or repeater RF node that includes:

(i) the repeater RF node identifier, and (ii) the repeater help request count;

in response to receiving a registration message, via the extended star wireless network, that the respective non-connected RF node, connected RF node, or repeater RF node transmits, transmitting the registration message to the repeater forwarding RF node identifier;

after waiting a first period of time, in response to not receiving the gateway heartbeat message or a respective repeater RF node heartbeat message, configuring the repeater RF node to act as a non-connected RF node; and after waiting a second period of time, in response to not receiving a respective active utilization message, configuring the repeater RF node to act as a connected RF node.

* * * * *